US012615552B2

(12) United States Patent (10) Patent No.: US 12,615,552 B2
Cao et al. (45) Date of Patent: Apr. 28, 2026

(54) QUALITY OF SERVICE MANAGEMENT METHOD AND APPARATUS

(71) Applicant: HUAWEI TECHNOLOGIES CO., LTD., Shenzhen (CN)

(72) Inventors: Longyu Cao, Shanghai (CN); Yijun Yu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 502 days.

(21) Appl. No.: 18/071,100

(22) Filed: Nov. 29, 2022

(65) Prior Publication Data

US 2023/0108693 A1    Apr. 6, 2023

Related U.S. Application Data

(63) Continuation of application No. PCT/CN2021/094928, filed on May 20, 2021.

(30) Foreign Application Priority Data

May 30, 2020    (CN) .......................... 202010480754.7

(51) Int. Cl.
 *H04W 28/24*        (2009.01)
 *H04W 72/543*       (2023.01)
(52) U.S. Cl.
 CPC ......... *H04W 28/24* (2013.01); *H04W 72/543* (2023.01)
(58) Field of Classification Search
 CPC ............................ H04W 28/24; H04W 72/543
 See application file for complete search history.

(56) References Cited

U.S. PATENT DOCUMENTS

2012/0127859 A1 *  5/2012  Ko .......................... H04L 47/629
                                                     370/232
2013/0326061 A1   12/2013  Li
                   (Continued)

FOREIGN PATENT DOCUMENTS

CN        102547610 A      7/2012
CN        102711192 A     10/2012
                   (Continued)

OTHER PUBLICATIONS

3GPP TS 23.502 V16.4.0 (Mar. 2020), 3rd Generation Partnership Project; Technical Specification Group Services and System Aspects; Procedures for the 5G System (5GS); Stage 2(Release 16), 582 pages.

*Primary Examiner* — Sujoy K Kundu
*Assistant Examiner* — Weibin Huang
(74) *Attorney, Agent, or Firm* — Rimon PC

(57)    ABSTRACT

Embodiments of this application relate to the field of communication technologies, and provide a quality of service management method and an apparatus, to adjust a QoS parameter in real time based on a status of a radio network resource, to therefore maximize utilization of radio resources. Specifically, a first network element receives a QoS parameter request sent by a second network element, where the QoS parameter request is for requesting a QoS parameter. The first network element determines a first QoS parameter based on at least one of service requirement information of a user, attribute information of the user, and a radio network resource of the second network element. The first network element sends the first QoS parameter to the second network element, to enable the second network element to allocate a radio network resource based on the first QoS parameter.

19 Claims, 13 Drawing Sheets

(56)  References Cited

U.S. PATENT DOCUMENTS

| | | | |
|---|---|---|---|
| 2014/0153523 | A1 | 6/2014 | Parantainen |
| 2018/0176927 | A1* | 6/2018 | Deng .................. H04W 72/542 |
| 2019/0104530 | A1* | 4/2019 | Deng .................... H04W 28/16 |
| 2020/0068446 | A1 | 2/2020 | Nimbavikar et al. |
| 2021/0289572 | A1* | 9/2021 | Deng .................... H04W 76/14 |
| 2021/0337555 | A1* | 10/2021 | Fan ....................... H04W 28/24 |
| 2022/0240122 | A1* | 7/2022 | Liu ........................ H04W 40/12 |
| 2022/0321429 | A1* | 10/2022 | Kahn .................. H04L 41/5006 |
| 2023/0054991 | A1* | 2/2023 | Zhu ....................... H04W 76/10 |

FOREIGN PATENT DOCUMENTS

| | | | |
|---|---|---|---|
| CN | 104507126 | A | 4/2015 |
| CN | 105493564 | A | 4/2016 |
| CN | 106792923 | A | 5/2017 |
| CN | 109526029 | A | 3/2019 |
| CN | 110661837 | A | 1/2020 |

* cited by examiner

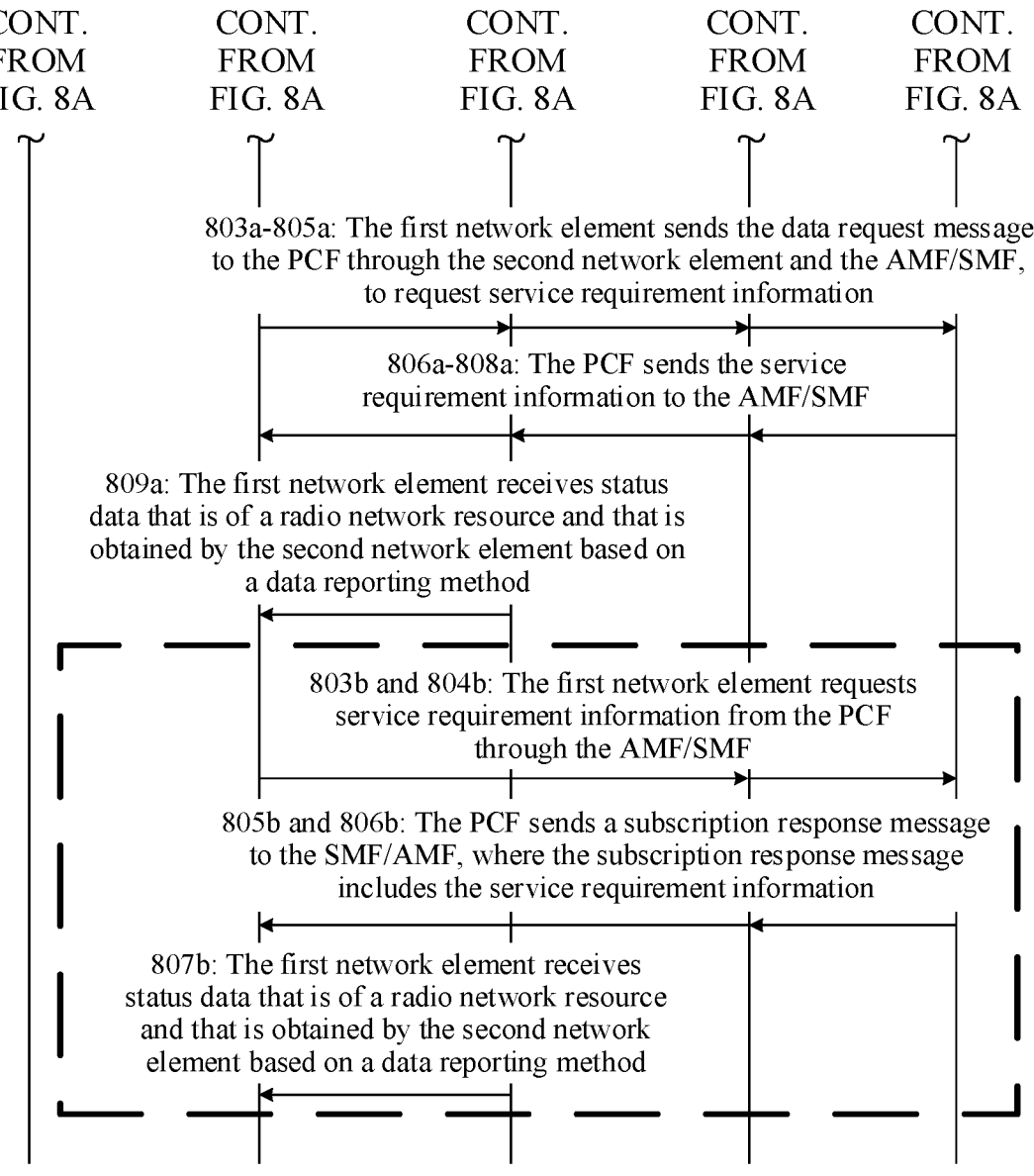

803a-805a: The first network element sends the data request message
to the PCF through the second network element and the AMF/SMF,
to request service requirement information 806a-808a: The PCF sends the service
requirement information to the AMF/SMF 809a: The first network element receives status
data that is of a radio network resource and that is
obtained by the second network element based on
a data reporting method 803b and 804b: The first network element requests
service requirement information from the PCF
through the AMF/SMF 805b and 806b: The PCF sends a subscription response message
to the SMF/AMF, where the subscription response message
includes the service requirement information 807b: The first network element receives
status data that is of a radio network resource
and that is obtained by the second network
element based on a data reporting method

FIG. 8B

QUALITY OF SERVICE MANAGEMENT METHOD AND APPARATUS

CROSS-REFERENCE TO RELATED APPLICATIONS

This application is a continuation of International Patent Application No. PCT/CN2021/094928, filed on May 20, 2021, which claims priority to Chinese Patent Application No. 202010480754.7 filed on May 30, 2020. The disclosures of the aforementioned applications are hereby incorporated by reference in their entireties.

TECHNICAL FIELD

This application relates to the field of communication technologies, and in particular, to a quality of service (QoS) management method and an apparatus.

BACKGROUND

With the development of radio network technologies, increasingly services are carried on radio networks. Each service has its unique features and service assurance requirements for the radio networks. Therefore, radio networks need to provide radio resources that meet these requirements, to ensure the service experiences of users. Usually, the service requirement for a radio network is reflected by QoS, and the radio network may implement access control, resource guarantee, and resource scheduling for the service based on the QoS requirement of the service.

A 5G network can provide users with a plurality of service types, such as cloud virtual reality (cloud VR) services, drone services, and 8K video on-live services. Different users have different QoS requirements for services. Even users using a same service have different QoS requirements for the service. For example, very important person (VIP) users and common users have different QoS requirements for the service.

Currently, in a QoS management solution, because a core network element cannot sense a radio resource status on an access network side, the core network element can determine a QoS parameter of a service only based on a service type requested by a terminal device. In addition, to meet service requirements of all users using a same service, currently, a same QoS parameter is configured for all of the users using the same service, and resources are allocated based on the QoS parameter. However, this may result in excessive allocation of radio resources. For example, radio resources are allocated to common users based on radio resources allocated to VIP users, causing a waste of radio resources, and affecting the subsequent access of service requests of other users. This is an unfavorable utilization of radio resources.

SUMMARY

Embodiments of this application provide a QoS management method and an apparatus, to adjust a QoS parameter in real time based on a status of a radio network resource, to therefore maximize utilization of radio resources.

To achieve the foregoing objective, the following technical solutions are used in embodiments of this application.

According to a first aspect, a quality of service QoS management method is provided. The method includes: A first network element receives a QoS parameter request sent by a second network element, where the QoS parameter request is for requesting a QoS parameter. The first network element determines a first QoS parameter based on service requirement information of a user and a radio network resource of the second network element. The first network element sends the first QoS parameter to the second network element, to enable the second network element to allocate a radio network resource based on the first QoS parameter. The first network element may be a first radio access controller, and the second network element may be an AN network element.

To be specific, when obtaining a QoS parameter configuration of a core network, the second network element does not immediately allocate a radio network resource based on a QoS parameter sent by the core network, but sends the QoS request to the first network element. Then, the first network element determines the first QoS parameter based on the service requirement information of the user and the radio network resource of the second network element. In this way, determining of the first QoS parameter is not only related to a service type (a service requirement), but also related to the currently available radio network resource of the AN network element. Therefore, in this application, QoS of the AN network element may be dynamically managed through the first network element, namely, the first radio access controller, and QoS parameter configuration and resource allocation are implemented through an interface B, to effectively use the radio network resource and maximize efficiency.

In a possible design, the service requirement information includes at least one of a media type and a bandwidth requirement of a service.

The determining of the first QoS parameter by the first network element may be further related to attribute information of the user, to be specific, the first network element determines the first QoS parameter based on the service requirement information of the user, the attribute information of the user, and the radio network resource of the second network element. The attribute information of the user includes at least one of the following information: a user priority, a subscriber profile identifier SPID, and an indication indicating that a terminal device of the user has a high access priority.

In comparison with a conventional technology in which a QoS parameter is determined based on a service type, in this application, the QoS parameter may be determined based on the service requirement information, the attribute information of the user, and information about the available radio network resource, so that the determined QoS parameter can conform to a current network status, to more effectively use the radio network resource.

In a possible design, the QoS parameter request includes the service requirement information of the user and the radio network resource of the second network element. Optionally, the QoS parameter request may further include the attribute information of the user.

To be specific, when obtaining the QoS parameter request, the second network element, namely, the AN network element, may send the QoS parameter request to the first network element to determine the QoS parameter, and does not directly allocate the radio network resource.

In a possible design, the QoS parameter request further includes a second QoS parameter configured by a core network based on a service type requested by the user. Before that the first network element determines a first QoS parameter based on service requirement information of a user and a radio network resource of the second network element, the method further includes: The first network element determines that the second QoS parameter does not match the radio network resource of the second network element.

To be specific, the second QoS parameter is configured by the core network. However, when the second QoS parameter is delivered to the second network element, namely, the AN network element, the AN network element does not directly allocate the radio network resource based on the second QoS parameter, but sends the second QoS parameter to the first network element, namely, the first radio access controller. The first radio access controller re-determines the first QoS parameter based on the service requirement information of the current user and the available radio network resource of the second network element, so that the re-determined first QoS parameter conforms to the current network status of the AN network element.

In a possible design, that the first network element determines that the second QoS parameter does not match the radio network resource of the second network element includes: If the first network element determines that the radio network resource of the second network element cannot be maximally used when the resource is allocated based on the second QoS parameter, the first network element determines that the second QoS parameter does not match the radio network resource of the second network element. Alternatively, if the first network element determines that excessive allocation of the radio network resource of the second network element is caused when the resource is allocated based on the second QoS parameter, the first network element determines that the second QoS parameter does not match the radio network resource of the second network element. This manner of determining that the second QoS parameter does not match the radio network resource of the second network element is merely an example, and imposes no limitation.

In a possible design, before that a first network element receives a QoS parameter request sent by a second network element, the method further includes: The first network element receives QoS management policy information sent by a management network element OAM, where the QoS management policy information includes a policy type and an application scope of a policy. The policy type includes a correspondence between a radio network resource and a QoS parameter. The application scope of the policy includes a service type to which the QoS management policy information is applied. The first network element determines a to-be-requested data type and a data reporting method based on the QoS management policy information, and sends a data request message to the second network element, where the data request message includes the to-be-requested data type and the data reporting method, and the data type includes a radio network resource. The first network element receives status data that is of the radio network resource and that is obtained by the second network element based on the data reporting method.

Therefore, in this application, an enhanced function of the first network element is provided, so that the QoS management policy can be deployed and installed, and the first network element dynamically obtains the status data of the radio network resource.

In a possible design, before that a first network element receives a QoS parameter request sent by a second network element, the method further includes: The first network element receives the service requirement information sent by a management network element OAM, where the service requirement information is requested by the OAM from an application function AF network element.

This design is also a process in a QoS policy configuration and data request procedure. In this design, a request for the service requirement information may be obtained at a time through a management plane, to be specific, after receiving a policy deployment request, the OAM may initiate, through a management interface, a request for obtaining the service requirement information from the AF. When receiving data returned by the AF, the OAM may send the returned data to a second radio access controller, and then the second radio access controller sends the data to the first network element. In this way, air-plane signaling exchange can be reduced, and network interface resources can be saved.

According to a second aspect, a quality of service QoS management method is provided. The method includes: A second network element sends a QoS parameter request to a first network element, where the QoS parameter request is for requesting a QoS parameter. The second network element receives a first QoS parameter sent by the first network element, where the first QoS parameter is determined by the first network element based on service requirement information of a user and a radio network resource of the second network element. The second network element allocates a radio network resource based on the first QoS parameter.

The second network element is an AN network element, and the first network element is a first radio access controller. When obtaining a configured QoS parameter from a core network, the AN network element does not directly allocate a resource based on the configured QoS parameter, but requests the first radio access controller to reconfigure the first QoS parameter, so that the reconfigured first QoS parameter conforms to a current network status, to improve utilization of network resources.

In a possible design, the service requirement information includes at least one of a media type and a bandwidth requirement of a service. Optionally, the first QoS parameter may be further determined by the first network element based on the service requirement information of the user, attribute information of the user, and the radio network resource of the second network element. The attribute information of the user includes at least one of the following information: a user priority, a subscriber profile identifier SPID, and an indication indicating that a terminal device of the user has a high access priority.

In comparison with a conventional technology in which a QoS parameter is determined based on a service type, in this application, the QoS parameter may be determined based on the service requirement information, the attribute information of the user, and information about the available radio network resource, so that the determined QoS parameter can conform to the current network status, to more effectively use the radio network resource.

In a possible design, the QoS parameter request includes the service requirement information of the user and the radio network resource of the second network element. Alternatively, the QoS parameter request includes the service requirement information of the user, the attribute information of the user, and the radio network resource of the second network element. To be specific, when obtaining the QoS parameter request, the second network element, namely, the AN network element, may send the QoS parameter request to the first network element to determine the QoS parameter, and does not directly allocate the radio network resource.

In a possible design, the QoS parameter request further includes a second QoS parameter configured by a core network. Before that a second network element sends a QoS parameter request to a first network element, the method further includes: The second network element receives a first data request message sent by the first network element, where the first data request message includes a requested data type and a data reporting method, and the data type includes a radio network resource. The second network element sends status data of the radio network resource to the first network element based on the data reporting method.

To be specific, the second QoS parameter is configured by a core network element. However, when the second QoS parameter is delivered to the second network element, namely, the AN network element, the AN network element does not directly allocate the radio network resource based on the second QoS parameter, but re-determines the first QoS parameter based on the service requirement information of the current user, the attribute information of the user, and the available radio network resource of the second network element, so that the re-determined first QoS parameter conforms to the current network status of the AN network element.

In a possible design, the first data request message further includes an identifier of a service. Before that a second network element sends a QoS parameter request to a first network element, the method further includes: The second network element sends a second data request message to a core network element, where the second data request message includes the identifier of the service, and the second data request message is for requesting, from the core network element, the service requirement information corresponding to the identifier of the service. The second network element receives the service requirement information sent by the core network element.

Therefore, when the first network element obtains the service requirement information from the core network element through the second network element, there is only a small impact on PDU session establishment in the current network, so that control-plane signaling exchange can be reduced, and network interface resources can be saved.

According to a third aspect, a first network element is provided. The first network element includes: a transceiver unit, configured to receive a QoS parameter request sent by a second network element, where the QoS parameter request is for requesting a QoS parameter; and a processing unit, configured to determine a first QoS parameter based on service requirement information of a user and a radio network resource of the second network element. The transceiver unit is further configured to send the first QoS parameter to the second network element, to enable the second network element to allocate a radio network resource based on the first QoS parameter.

In a possible design, the service requirement information includes at least one of a media type and a bandwidth requirement of a service. Determining of the first QoS parameter may be further related to attribute information of the user. The attribute information of the user includes at least one of the following information: a user priority, a subscriber profile identifier SPID, and an indication indicating that a terminal device of the user has a high access priority.

In a possible design, the QoS parameter request includes the service requirement information of the user and the radio network resource of the second network element. Alternatively, the QoS parameter request includes the service requirement information of the user, the attribute information of the user, and the radio network resource of the second network element.

In a possible design, the QoS parameter request further includes a second QoS parameter configured by a core network based on a service type requested by the user. The processing unit is further configured to determine that the second QoS parameter does not match the radio network resource of the second network element.

In a possible design, the transceiver unit is further configured to: receive QoS management policy information sent by a management network element OAM, where the QoS management policy information includes a policy type and an application scope of a policy, the policy type includes a correspondence between a radio network resource and a QoS parameter, and the application scope of the policy includes a service type to which the QoS management policy information is applied; determine a to-be-requested data type and a data reporting method based on the QoS management policy information, and send a data request message to the second network element, where the data request message includes the to-be-requested data type and the data reporting method, and the data type includes a radio network resource; and receive status data that is of the radio network resource and that is obtained by the second network element based on the data reporting method.

In a possible design, the transceiver unit is further configured to receive the service requirement information sent by a management network element OAM, where the service requirement information is requested by the OAM from an application function AF network element.

According to a fourth aspect, a second network element is provided. The second network element includes: a transceiver unit, configured to send a QoS parameter request to a first network element, where the QoS parameter request is for requesting a QoS parameter, and the transceiver unit is further configured to receive a first QoS parameter sent by the first network element, where the first QoS parameter is determined by the first network element based on service requirement information of a user and a radio network resource of the second network element; and a processing unit, configured to allocate a radio network resource based on the first QoS parameter.

In a possible design, the service requirement information includes at least one of a media type and a bandwidth requirement of a service.

Alternatively, the first QoS parameter may be determined by the first network element based on the service requirement information of the user, attribute information of the user, and the radio network resource of the second network element. The attribute information of the user includes at least one of the following information: a user priority, a subscriber profile identifier SPID, and an indication indicating that a terminal device of the user has a high access priority.

In a possible design, the QoS parameter request includes the service requirement information of the user and the radio network resource of the second network element. Alternatively, the QoS parameter request includes the service requirement information of the user, the attribute information of the user, and the radio network resource of the second network element. The QoS parameter request further includes a second QoS parameter configured by a core network.

In a possible design, the transceiver unit is further configured to: receive a first data request message sent by the first network element, where the first data request message includes a requested data type and a data reporting method, and the data type includes a radio network resource; and send status data of the radio network resource to the first network element based on the data reporting method.

In a possible design, the first data request message further includes an identifier of a service. The transceiver unit is further configured to: send a second data request message to a core network element, where the second data request message includes the identifier of the service, and the second data request message is for requesting, from the core network element, the service requirement information corresponding to the identifier of the service; and receive the service requirement information sent by the core network element.

According to a fifth aspect, a computer-readable storage medium is provided. The computer-readable storage medium includes computer instructions. When the computer instructions are run on an electronic device, the electronic device is enabled to perform the method according to any one of the first aspect or the possible designs of the first aspect.

According to a sixth aspect, a computer-readable storage medium is provided. The computer-readable storage medium includes computer instructions. When the computer instructions are run on an electronic device, the electronic device is enabled to perform the method according to any one of the second aspect or the possible designs of the second aspect.

According to a seventh aspect, a computer program product is provided. When the computer program product runs on a computer, the electronic device is enabled to perform the method according to any one of the first aspect or the possible designs of the first aspect.

According to an eighth aspect, a computer program product is provided. When the computer program product runs on a computer, the electronic device is enabled to perform the method according to any one of the second aspect or the possible designs of the second aspect.

BRIEF DESCRIPTION OF DRAWINGS

FIG. 8A and FIG. 8B are a diagram of signaling exchange in a QoS management method according to an embodiment of this application;

DESCRIPTION OF EMBODIMENTS

The following describes technical solutions in embodiments of this application with reference to the accompanying drawings in embodiments of this application. In descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

Embodiments of this application intend to adjust a QoS parameter of a user service in a radio network technology, so that an AN network element can obtain an appropriate QoS parameter based on a current network environment, to allocate and schedule a resource based on an adjusted QoS parameter.

Figure 1:
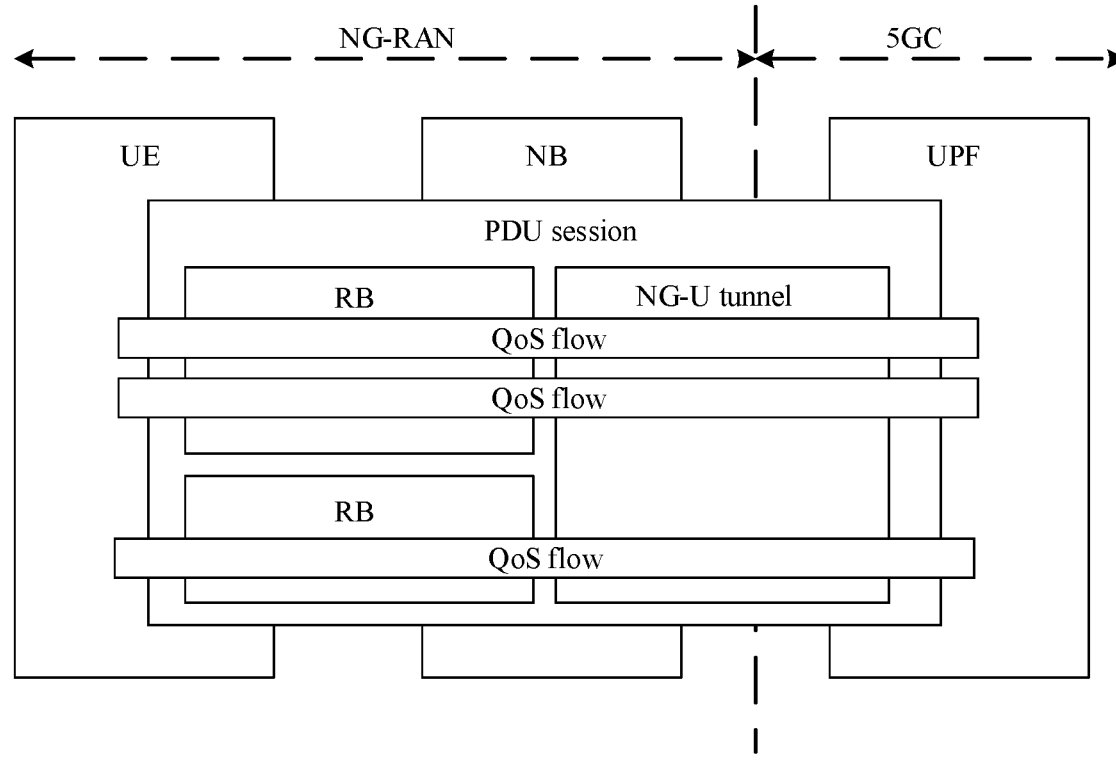
FIG. 1 shows an application scenario of a QoS flow according to an embodiment of this application.

Based on this, an application scenario of the QoS parameter is first described in this application by using an example. Currently, a QoS model management mechanism is proposed in 5G, where the mechanism is specifically implementing quality of service assurance for a user service based on a QoS flow. The QoS flow is a logical concept for describing a service flow. Different QoS flows are configured based on different QoS parameters to support service data transmission with different requirements, as shown in FIG. 1. When a user initiates a service request, a network side may create one or more protocol data unit sessions (PDU sessions) (PDU sessions for short in FIG. 1) for such service request of UE. The PDU sessions are for transmitting different service data. The PDU session may include two parts: a radio bearer (RB) between the user equipment (UE) and a next-generation radio access network (NG-RAN) network element (the UE and a NodeB (NB)) and a next-generation user plane channel (NG-U tunnel) between the NG-RAN network element and a user plane function (UPF) network element in a 5G core network (5GC). Because different service flows of the user service have different requirements, resources need to be allocated and scheduled in the PDU session based on a plurality of QoS parameters. Therefore, configuration is performed (on the RB and the NG-U tunnel) in the PDU session based on a plurality of types of QoS flows (corresponding to the plurality of QoS parameters).

Each QoS flow corresponds to one QoS flow identifier (QFI), where the QFI is a unique flow identifier in the PDU session. A QoS profile is for describing an attribute of a QoS parameter corresponding to the QoS flow. In addition, one UE may support establishment of a plurality of PDU sessions, and each PDU session may include a plurality of QoS flows. One data radio bearer (DRB) supports configuration of a plurality of types of QoS flows. Therefore, a new user plane protocol (SDAP) layer is introduced in a RAN to perform adaptive mapping between a QoS flow and a DRB.

Figure 2:
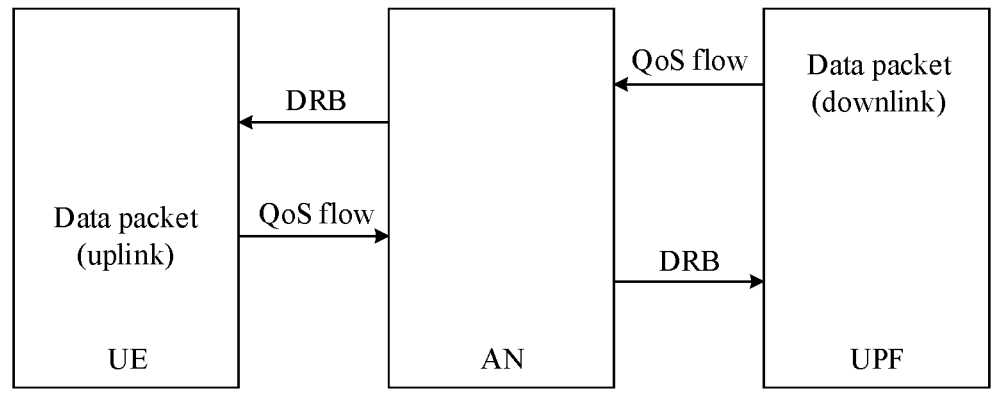
FIG. 2 is a schematic diagram of a data transmission process of a user service according to an embodiment of this application.

After the PDU session is created, a link for the UE to transmit service data of the user is established, and the UE may send or receive data through the link. FIG. 2 shows a data transmission process of a user service. For downlink data, a UPF may map a data packet to a QoS flow based on a service data flow filter template, add a QFI label to a data packet header, and send the data packet to an access network (AN) (namely, an NG-RAN network element). The AN may map the corresponding data packet to a corresponding DRB based on the QFI label in the received data packet header, and send the data packet to an UE. For uplink data, the UE may map a data packet to a corresponding QoS flow according to a QoS policy, and complete mapping from the QoS flow to a DRB at an application layer of the UE. The AN may determine a QFI label of the uplink data based on the received DRB for the uplink data of the UE, add the QFI label to a data packet header, and send the data packet to the UPF.

Figure 3:
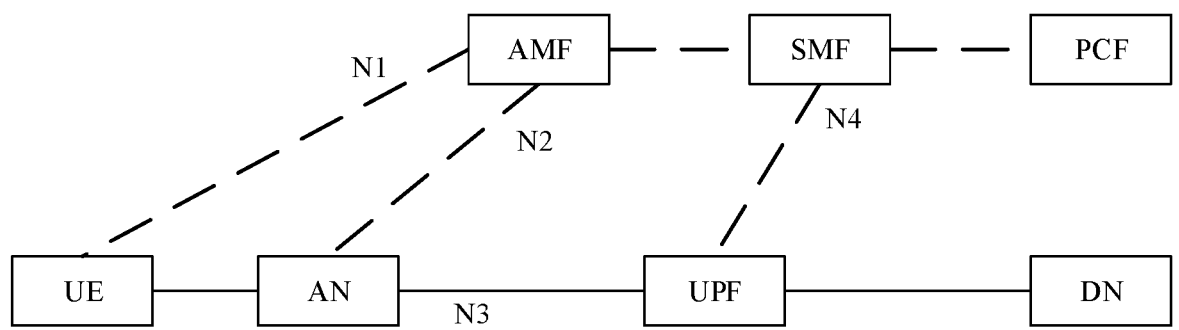
FIG. 3 is a schematic diagram of a network architecture for a QoS parameter configuration according to an embodiment of this application.

A network architecture shown in FIG. 3 may be applied to configuration of the QoS parameter corresponding to the QoS flow. Based on a QoS model shown in FIG. 1, in a PDU session establishment process, a core network element (a session management function, SMF) determines a QoS parameter, QFI allocation, and the like based on a service type requested by UE and a static policy and charging control (PCC) policy locally configured by the SMF or based on the service type and a dynamic PCC policy obtained through interaction with a policy control function (PCF). In addition, the SMF configures a resource and a scheduling policy for a UPF through an N4 interface, and configures a QoS profile for an AN through an access and mobility management function (AMF) and an N2 interface. Then, the AN allocates a radio resource to the UE based on information, such as the QoS profile and the QFI allocation, that is sent by the SMF, and configures a radio network related parameter and a scheduling policy.

Currently, 5G can provide more diversified service types for users, and different users have different QoS requirements for services. For example, users who use an 8K video on-live service are classified into VIP users (a small quantity of users) and common users (most users). The VIP users require 100 M bandwidth to ensure service requirements, and the common users require only 20 M bandwidth to ensure service requirements. According to a QoS parameter allocation solution in a conventional technology, during QoS parameter allocation, an SMF configures a same QoS parameter for the VIP users and the common users because of a same service type. To ensure the service requirements of all the users using the service, the QoS parameter needs to be configured based on the requirements of the users with a highest bandwidth requirement. Therefore, 100 M bandwidth resources are allocated even to the common users. However, actually, the common users may require only 20 M bandwidth. As a result, extra 80 M bandwidth is wasted. This is unfavorable to utilization of radio network resources.

It may be understood that a main reason why the radio network resources cannot be effectively used is that an AN side does not have a QoS control capability, and cannot adaptively adjust, based on a status of the radio resources, a QoS parameter delivered by a core network. Therefore, this application provides a QoS management method. In the method, an AN network element may dynamically adjust a QoS parameter configured by a core network, so that a radio network resource can be effectively used by using an adjusted QoS parameter.

Figure 4:
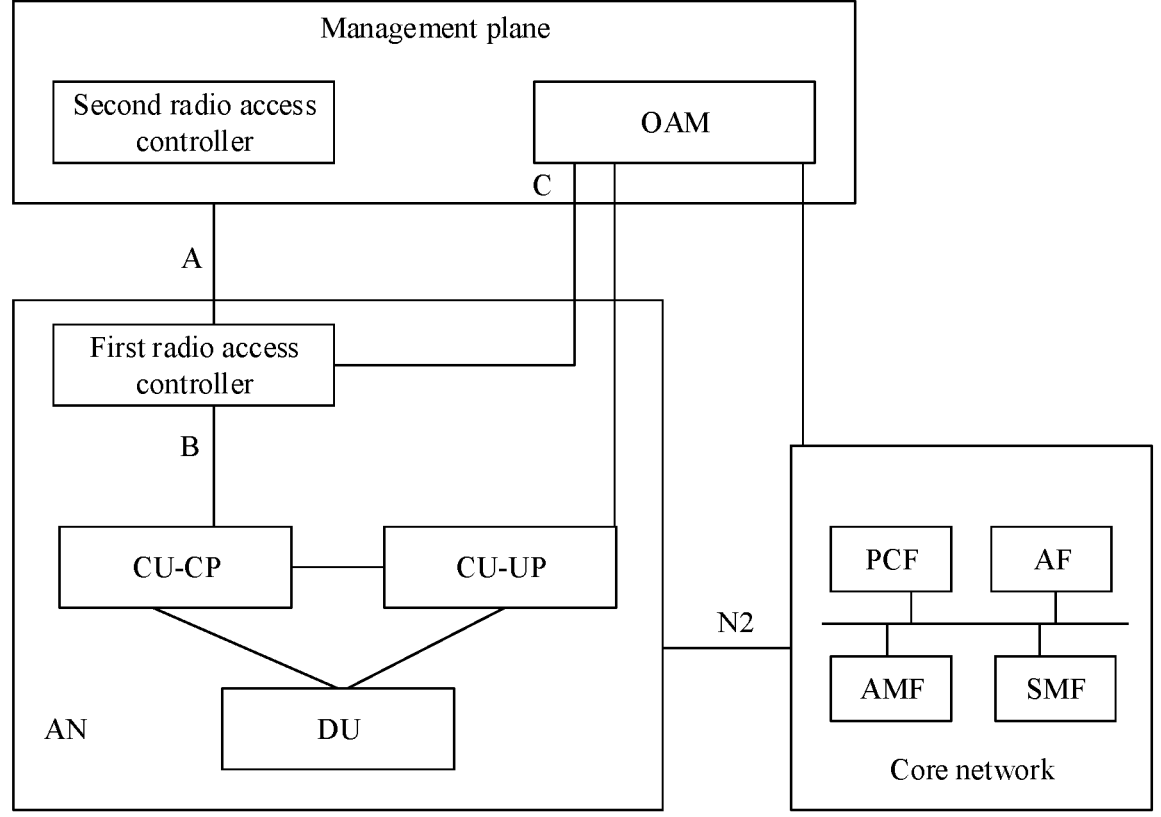
FIG. 4 is a schematic diagram of a system architecture according to an embodiment of this application.

Based on this, the method provided in this application may be applied to a system architecture shown in FIG. 4. The architecture includes AN network elements, core network elements, a first radio access controller, and a management network element (an operation, administration, and maintenance, OAM). The architecture may further include a second radio access controller. The OAM and the second radio access controller are logically two different functional modules, or may serve as independent network elements. Usually, the second radio access controller may be integrated into the OAM, and used as an internal functional component module of the OAM. The second radio access controller and the OAM may be understood as management plane network elements or modules.

The OAM is a general name of the management network element, and may be specifically implemented by an open networking automation platform (ONAP), a network management system (NMS), or another management network element. In embodiments of this application, the second radio access controller is used as a module component of the OAM to describe the solutions. However, the solutions of this application are also applicable to a deployment scenario in which the second radio access controller and the OAM are independent of each other.

In FIG. 4, the first radio access controller may be an independently deployed network element, or may be integrated with a central unit-control plane (CU-CP) of the AN. In the following embodiments of this application, related descriptions are provided by using the first radio access controller as an independent network element. However, the solutions of this application are also applicable to a scenario in which the first radio access controller is integrated with the CU-CP, and the scenario falls within the protection scope of this application.

Functions of the second radio access controller may be controlling and optimizing the AN network elements and resources in FIG. 4, performing processing (including model training and update) based on artificial intelligence workflows, and implementing application/feature management according to policies. An interface for communication between the second radio access controller and the first radio access controller may be an interface A.

Functions of the first radio access controller may be implementing near-real-time control and optimization of the AN function network elements (for example, the CU-CP) and the resources based on data collection and operation instructions over an interface B. An interface between the first radio access controller and the OAM may be an interface C.

The CU-CP is the central unit-control plane of the AN, and may implement radio resource control (RRC) protocol control plane functions and packet data convergence protocol (PDCP) control plane functions.

A central unit-user plane (CU-UP) is a central unit-user plane of the AN, and implements PDCP user plane functions and service data adaptation protocol (SDAP) functions.

A distributed unit (DU) is a distributed unit of the AN, and is configured to implement, for example, radio link control (RLC)/media access control (MAC) functions and some physical layer protocol functions.

The OAM may provide operation, maintenance, and management for a radio access network (RAN) functional module.

The core network elements may include an AMF, an SMF, a PCF, an application function (AF) network element, and the like. The AMF is mainly responsible for access control and mobility functions of UE, including authentication and authorization, location area tracking, and the like of the UE. The SMF may be responsible for PDU session management, including creation, modification, deletion, and the like. The PCF may be responsible for functions of managing policies such as QoS policies and charging policies. The AF may be responsible for functions such as application service requirement policy management. An interface for communication between the AN side and a core network may be an N2 interface.

As the network architecture in FIG. 4 is applied, in this application, a function of the first radio access controller may be enhanced to provide a QoS management capability. To be specific, the first radio access controller can perform dynamic QoS configuration based on a status of a radio network resource, service requirement information, and a user attribute, and flexibly manage the radio resource in coordination with the functional network element of the AN. In this way, a more refined radio resource allocation solution is provided.

Based on the foregoing inventive idea, the solutions of this application mainly include: configuration of a QoS management policy, obtaining of QoS network data (including a data request and data reporting), and execution of the QoS management policy. In short:

The second radio access controller may generate the QoS management policy based on a QoS management policy deployment request, and send the QoS management policy to the first radio access controller through the interface A.

The first radio access controller may request required network/user data (including a real-time status of the radio network resource, a user attribute feature (for example, a user priority), and the like) from the AN network element through the interface B. The AN may collect and report the corresponding network/user data based on a data request of the first radio access controller.

The first radio access controller determines a QoS parameter configuration based on the QoS management policy delivered through the interface A, the real-time status of the radio network resource, and the user attribute feature (for example, the user priority).

The first radio access controller indicates, through the interface B, the CU/DU to perform QoS parameter configuration and allocate a radio resource to the corresponding UE, to ensure normal running of a service of a priority user, meet a user requirement, and ensure user experience.

To support implementation of the solutions of this application, in this application, the function of the first radio access controller is enhanced to support a QoS management function, to implement policy-based QoS management, including decision of a QoS management policy execution condition and artificial intelligence-based QoS parameter decision. An enhanced QoS management functional component may be used as an internal functional component module of the first radio access controller, or may be deployed as a network element independent of the first radio access controller. The solutions of this application are not limited to the foregoing two manners. In embodiments of this application, an interface message for communication between the QoS management functional component and another functional component module of the first radio access controller is described.

First, in embodiments of this application, a case in which the second radio access controller creates the QoS management policy on the first radio access controller through the interface A and the first radio access controller requests the required related network data from the AN network element (for example, the DU) based on policy information is described, and a procedure for deploying the newly added QoS management functional component is further described.

It should be noted that, in the following descriptions of embodiments of this application, a first network element is a first radio access controller, and a second network element is an AN network element.

Embodiment 1

Figure 5:
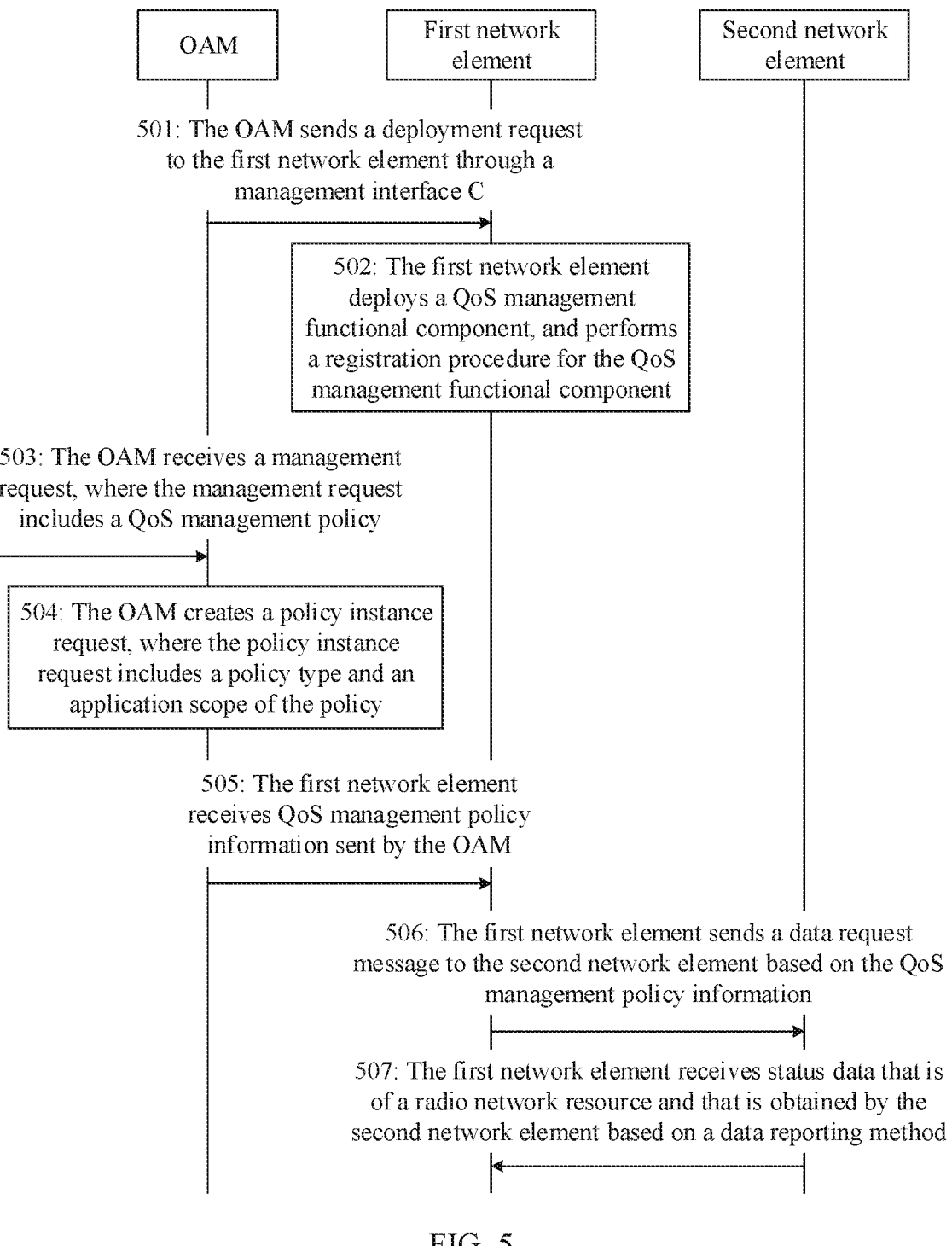
FIG. 5 is a diagram of signaling exchange in a QoS management method according to an embodiment of this application.

FIG. 5 is a schematic diagram of a procedure for deploying a QoS management functional component, a QoS management policy creation procedure, a data request procedure, and the like in a QoS management method. The method includes the following steps.

501: An OAM sends a deployment request to a first network element through a management interface C, where the deployment request includes a deployment profile for the QoS management functional component and related configuration information.

After the first radio access controller receives the deployment request, an internal functional module of the first radio access controller may perform function loading, parameter configuration, and the like for the QoS management functional component. The first radio access controller may include a plurality of functional component modules. In this application, all common functional component modules in the first radio access controller are collectively referred to as radio access controller platform functions to describe the solutions.

502: The first network element deploys the QoS management functional component, and performs a registration procedure for the QoS management functional component.

After the first network element deploys and enables the QoS management functional component, the QoS management functional component registers feature information of the QoS management functional component with the radio access controller platform function, where the feature information includes a data type required by function execution of the QoS management functional component. The data type may be, for example, radio network resource data (such as available radio resource data), attribute information of a user, service requirement information, policy information (for example, a QoS management policy) that is based on the required data type, and a data type (for example, a QoS parameter/QoS profile) that is of the QoS management policy and that is generated by an application scope of the policy.

503: The OAM receives a management request, where the management request includes the QoS management policy.

Herein, an administrator of an operator may receive the management request on the OAM. The management request may be understood as a deployment request for the QoS management policy, and the QoS management policy may include information such as a policy type and the application scope of the policy.

In this embodiment of this application, a value of the type may be QoS_Mgt, where QoS_Mgt may indicate a matching relationship between a radio network resource and a QoS parameter, or the like. A value of the scope may be 5QI group, where 5QI group is for identifying a service type to which the QoS management policy is applicable. The service type may be, for example, a mobile broadband (MBB) service (a text service, a video service, or the like on a web page), a low-latency service, or an Internet of Things service.

504: The OAM creates a policy instance request, where the policy instance request includes the policy type and the application scope of the policy.

The OAM may notify, through an interface (for example, an interface C) between the OAM and a second radio access controller, the second radio access controller to create the policy instance request, to be specific, request the second radio access controller to create the policy type and the application scope of the policy in the QoS management policy. The second radio access controller may model the QoS management policy based on a policy model over an interface A, and send QoS management policy information to the first radio access controller through the interface A, where the QoS management policy information may include the policy type and the application scope of the policy.

505: The first network element receives the QoS management policy information sent by the OAM, where the QoS management policy information includes the policy type and the application scope of the policy.

The radio access controller platform function in the first radio access controller may receive the QoS management policy information sent by the second radio access controller in the OAM, where the QoS management policy information is for requesting the radio access controller platform function to create a QoS management policy instance.

506: The first network element sends a data request message to a second network element based on the QoS management policy information, where the data request message includes a requested data type and a data reporting method, and the data type includes a radio network resource.

After receiving the QoS management policy information of the second radio access controller, the radio access controller platform function may notify, through an internal interface, the QoS management functional component of the QoS management policy information received through the interface A. The QoS management functional component may determine, based on the QoS management policy information and function logic of the QoS management functional component, data information required by the QoS management functional component, and send the data request message for the determined data information to the radio access controller platform function, where the data request message includes the requested data type (namely, status data of the radio network resource (cell resource data)), the data reporting method (a report type), and the like. The data reporting method indicated by the report type may be, for example, performing reporting upon changes of resources (ResChangeReport), performing reporting immediately after data collection is completed (reporting), and periodic reporting.

The radio access controller platform function determines all managed AN network elements. The AN network element herein may be specifically a DU in an AN. After determining the AN network element, the radio access controller platform function may send the data request message to the AN network element through an interface B. Then, the AN may start to collect the status data of the radio network resource, and report the status data of the radio network resource to the first radio access controller based on the indicated data reporting method.

507: The first network element receives the status data that is of the radio network resource and that is obtained by the second network element based on the data reporting method.

The AN network element may send the collected status data of the radio network resource to the radio access controller platform function based on the data reporting method, the radio access controller platform function then sends the status data of the radio network resource to the QoS management functional component, and the QoS management functional component receives and stores the status data of the radio network resource.

In this way, the first network element collects the status data of the radio network resource of the second network element.

It should be noted that the foregoing steps 501 to 507 may be performed after deployment and onboarding of the AN network element. After deployment and onboarding of a new AN network element, to implement a data request to the newly onboard AN network element, in this application, the first radio access controller may send a data request message of the QoS management functional component to the AN network element by using an interface B-based management procedure. An implementation process thereof may be as follows (where steps 508 to 510 are not shown in FIG. 5):

508: After deployment and onboarding of the second network element, the second network element initiates interface connection setup to the first network element.

Deployment and onboarding of the second network element may be deployment and onboarding of the DU. The interface connection setup may be that the DU sends a B setup message to the radio access controller platform function.

509: The first network element sends the data request message to the newly onboard second network element.

When responding to the B setup request of the DU, the radio access controller platform function may send, to the newly onboard DU network element, the data request message previously sent by the QoS management functional component, where the data request message includes the requested data type (namely, the status data of the radio network resource), the data reporting method, and the like. In addition, the radio access controller platform function may notify the QoS management functional component of information about the newly onboard DU, where the information about the DU includes at least one of an identifier of the DU and an address of the DU.

510: Refer to step 507.

Therefore, in this application, an enhanced function of the first radio access controller is provided, so that the QoS management policy can be deployed and installed, and the first radio access controller dynamically obtains the status data of the radio network resource.

Embodiment 2

Figure 6A:
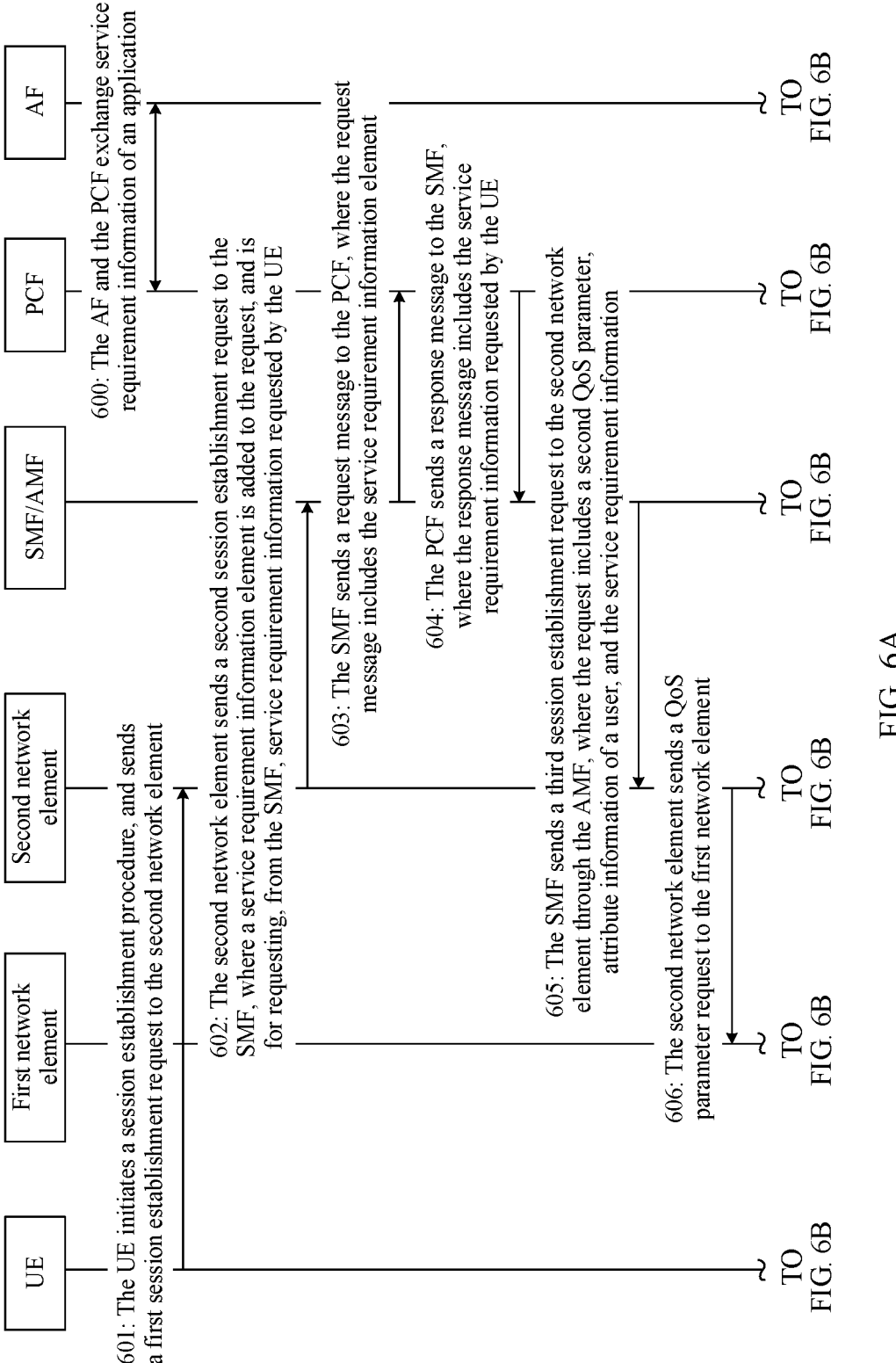
FIG. 6A and FIG. 6B are a schematic diagram of signaling exchange in an execution process of a QoS management policy according to an embodiment of this application.
Figure 6B:
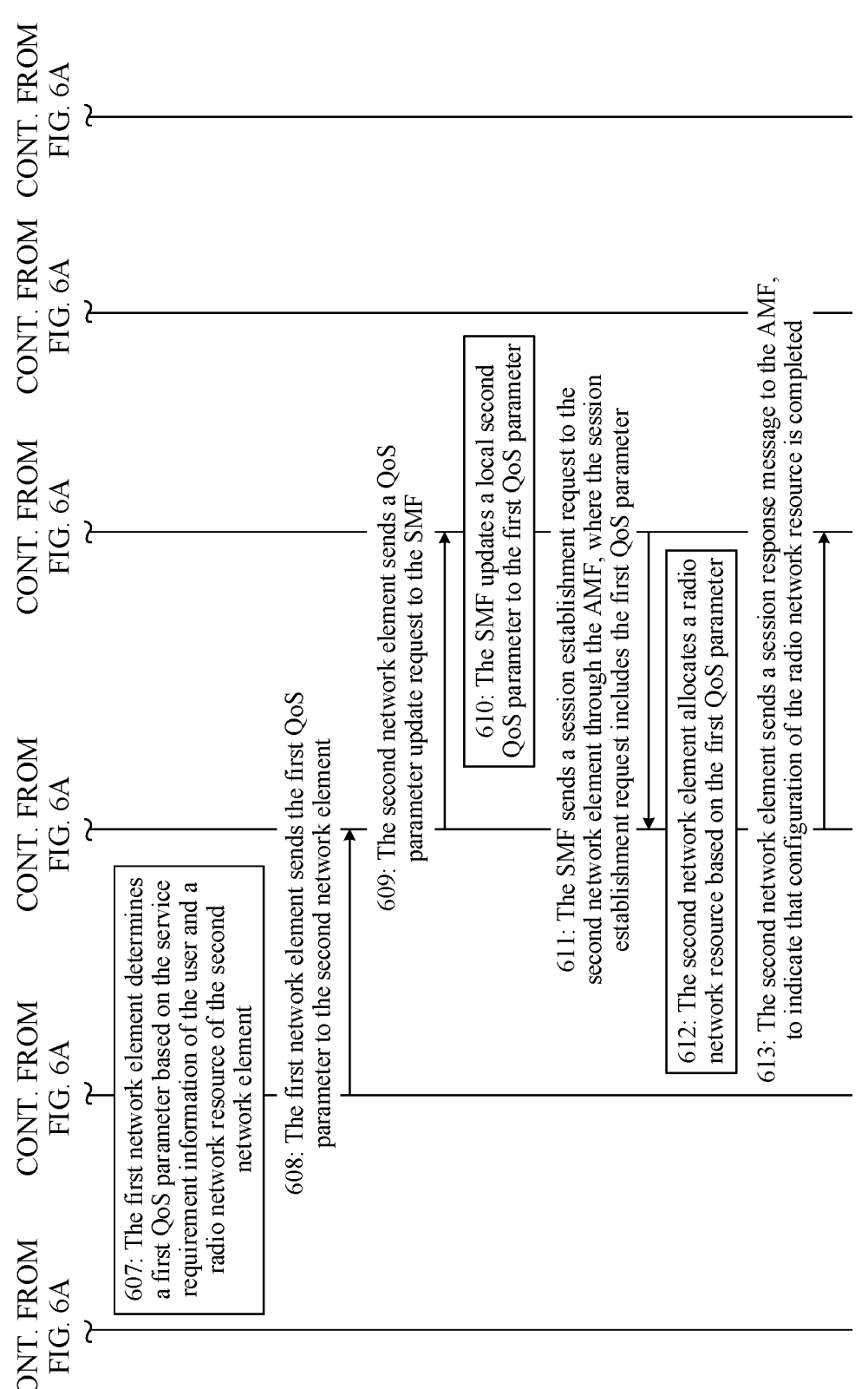

After a QoS management policy is created and installed, the following describes an execution process of the QoS management policy. In brief, in a service procedure of an UE, a first radio access controller may make a QoS parameter decision based on deployment and installation of the existing QoS management policy and collected status data of a radio resource, and indicate a CU/DU to perform QoS parameter configuration and allocate a radio resource. FIG. 6A and FIG. 6B are a schematic diagram of the execution process of the QoS management policy. The process may include the following steps.

600: An AF and a PCF exchange service requirement information of an application.

Before a PDU session in 5G is established, the AF may send the service requirement information of the application of the AF to the PCF. The service requirement information may include at least one of a media type and a bandwidth requirement of a service, an application identifier (application ID), and a service filter template. When receiving the service requirement information of the application, the PCF may reply to the AF with corresponding information, such as QoS, that meets the application service.

The media type may be an online video, a text, or the like.

601: The UE initiates a session establishment procedure, and sends a first session establishment request to a second network element, where the first session establishment request includes information such as an identifier of the UE and a requested service type.

The session establishment procedure may be a PDU session establishment procedure, and the first session establishment request may be a PDU session establishment NAS (non-access stratum) request.

602: The second network element sends a second session establishment request to an SMF, where a service requirement information element is added to the second session establishment request, and the service requirement information element is for requesting, from the SMF, service requirement information requested by the UE.

To be specific, after receiving the first session establishment request sent by the UE, the AN network element may add the service requirement information element to the first session establishment request, and send, to the SMF through an N2 interface, the second session establishment request added with the information element.

603: The SMF sends a request message to the PCF, where the request message includes the service requirement information element, to request, from the PCF, the service requirement information requested by the UE.

604: The PCF sends a response message to the SMF, where the response message includes the service requirement information requested by the UE.

605: The SMF sends a third session establishment request to the second network element through an AMF, where the third session establishment request includes a second QoS parameter, attribute information of a user, and the service requirement information.

The third session establishment request may be an N2 PDU session request message, and the N2 PDU session request message includes the second QoS parameter, the attribute information of the user, the service requirement information, and the like that are sent by the SMF to the AN network element.

The attribute information of the user may include a user priority, and the user priority may be obtained by the AMF from subscription data of the UE. The service requirement information includes the media type, the bandwidth requirement, and the like.

606: The second network element sends a QoS parameter request to a first network element, where the QoS parameter request is for requesting a QoS parameter.

To be specific, after receiving the N2 PDU session request message sent by the SMF, the AN network element does not directly allocate a radio network element resource based on the second QoS parameter sent by the SMF, but triggers a QoS management function of the first network element, namely, the first radio access controller. The AN network element herein may be specifically a CU-CP. To be specific, the CU-CP sends the QoS parameter request to the first radio access controller. The QoS parameter request may further include the service requirement information of the user and a radio network resource of the second network element in addition to the second QoS parameter, or may further include the service requirement information of the user, the attribute information of the user, and a radio network resource of the second network element in addition to the second QoS parameter. In this case, the attribute information of the user may include at least one of the following information: the identifier of the UE, a QFI, the user priority, a subscriber profile identifier (SPID), and an indication indicating that a terminal device of the user has a high access priority (high priority access). The high priority access may be sent by the UE to the AN network element when the UE initially accesses a network. The SPID may be sent by the AMF of the core network to the AN network element when the UE registers with the network, and indicates information about a preferential RAT or frequency for the UE.

607: The first network element determines a first QoS parameter based on the service requirement information of the user and the radio network resource of the second network element.

Alternatively, the first network element may determine a first QoS parameter based on the service requirement information of the user, the attribute information of the user, and the radio network resource of the second network element.

The first radio access controller may first evaluate whether the second QoS parameter sent by the SMF conforms to an actual case of the radio network resource, for example, whether the available radio network resource of the AN can be maximally used when the radio network resource is allocated based on the second QoS parameter, or whether excessive allocation of the available radio network resource of the AN is caused when the radio network resource is allocated based on the second QoS parameter. If the foregoing case is caused, the first radio access controller may determine the new first QoS parameter, namely, an updated QoS parameter (an updated QoS profile), by using an artificial intelligence method with reference to information such as the user priority, the SPID, the high priority access, the media type, the bandwidth requirement, and the available radio network resource.

608: The first network element sends the first QoS parameter to the second network element.

The first radio access controller sends a QoS parameter response message to the AN network element. The QoS parameter response message includes the first QoS parameter, and may further include the identifier of the UE, the QFI, and the like.

609: The second network element sends a QoS parameter update request to the SMF, where the QoS parameter update request includes the first QoS parameter.

The AN network element may send, to the SMF through the N2 interface, the first QoS parameter determined by the first radio access controller, and indicate the SMF to update the second QoS parameter to the first QoS parameter.

610: The SMF updates the local second QoS parameter to the first QoS parameter, and updates a QoS rule based on the latest first QoS parameter.

611: The SMF sends a session establishment request to the second network element through the AMF, where the session establishment request includes the first QoS parameter.

The session establishment request may be an N2 PDU session request message, and the message may include the first QoS parameter or the QoS rule sent by the SMF to the UE. In this way, the second network element may allocate a radio network resource based on the first QoS parameter.

612: The second network element allocates the radio network resource based on the first QoS parameter.

After receiving the session establishment request from the SMF, the AN network element may initiate PDU session establishment on a CU-CP, and allocate a resource and configure a scheduling policy on the CU-CP based on the first QoS parameter. In addition, the AN network element may initiate session establishment on the DU, and allocate a resource and configure a scheduling policy on the DU based on the first QoS parameter.

613: The second network element sends a session response message to the AMF, to indicate that configuration of the radio network resource is completed.

In addition, the AN network element may further transparently transmit, to the UE, a PDU session accept NAS message sent by the SMF to the UE. The message may include the updated first QoS parameter or the QoS rule, so that the UE can perform uplink communication based on the new QoS parameter. The UE may further return a session establishment complete message to the AN network element. After receiving the session establishment complete message, the AN network element may reply to the SMF with routing information of downlink data of the AN network element through the N2 interface, and then the SMF sends the routing information of the downlink data of the AN network element to a UPF or the like. For a specific implementation of this step, refer to related steps in a PDU session establishment procedure in a 5G network. Details are not described in this application.

It may be understood that in steps 600 to 613, functions of an interface A, an interface B, the N2 interface, the AN network element, and the SMF are enhanced to some extent in this application.

Therefore, in this application, QoS of the AN network element may be dynamically managed through the first network element, namely, the first radio access controller, and QoS parameter configuration and resource allocation are implemented through the interface N2, so that the radio network resource can be effectively used and efficiency can be maximized.

Embodiment 3

Figure 7:
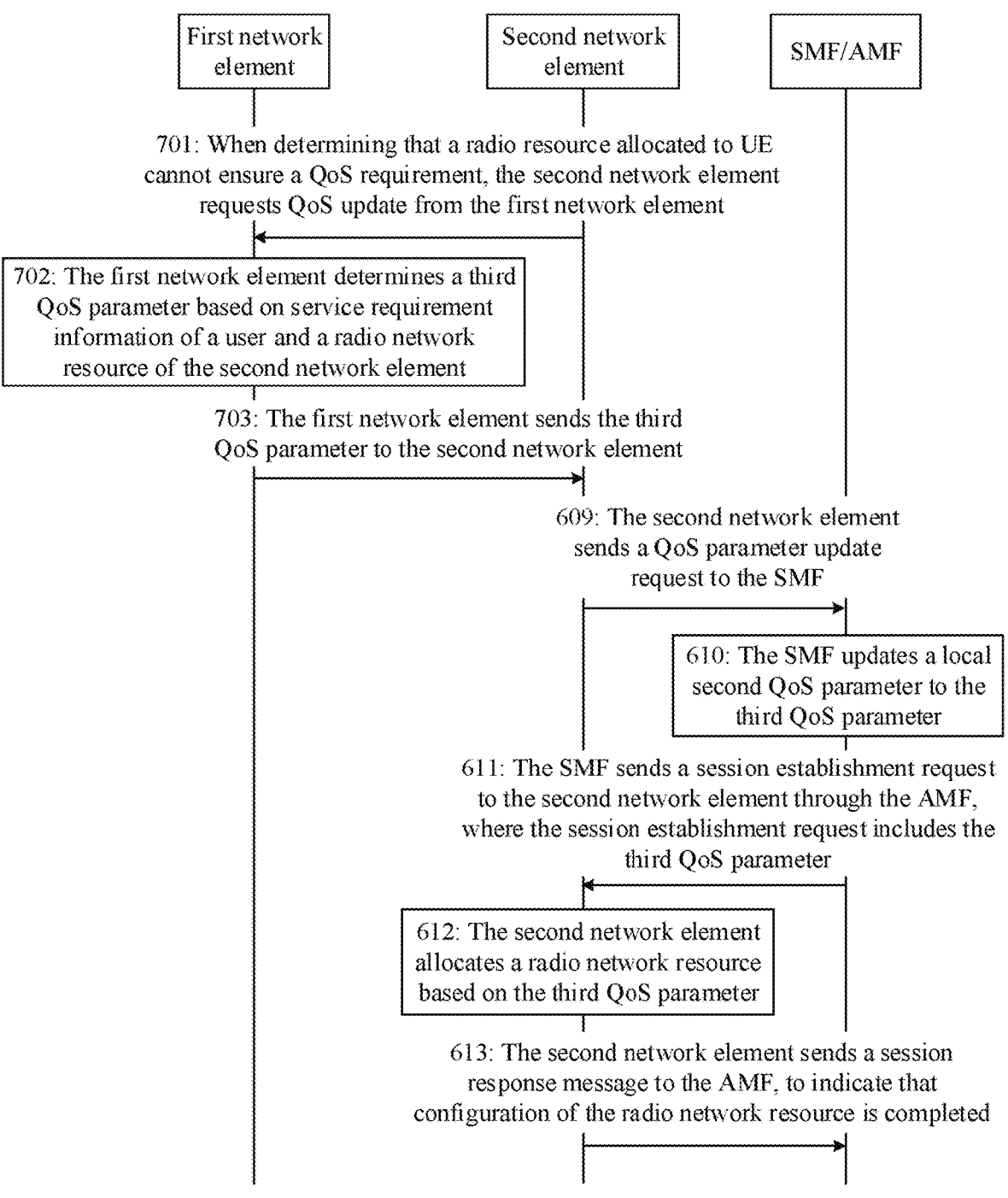
FIG. 7 is a diagram of signaling exchange in a QoS management method according to an embodiment of this application.

It can be learned from the foregoing process that, in this application, in a resource allocation method in 5G, when a resource of an AN network element cannot ensure a QoS requirement of a service, the AN network element may notify an SMF to adjust a QoS parameter. In this case, based on the solution idea of this application, for this scenario, when the resource of the AN network element cannot ensure the QoS requirement of the service, the AN network element may alternatively notify, through an interface B, a first radio access controller to perform QoS control and management, including QoS parameter update, resource reallocation, and the like, to further indicate a CU/DU to perform a related operation. A procedure may be that shown in FIG. 7, and the method may further include the following steps.

701: When determining that a radio resource allocated to an UE cannot ensure the QoS requirement, the second network element requests QoS update from the first network element.

Because an available resource of the second network element changes with a network status, the available radio network resource may not match initial first QoS. Moreover, a service requirement of the UE may also change. Therefore, the QoS requirement may change accordingly, and a corresponding first QoS parameter needs to be adjusted.

For example, when the DU detects that a radio network resource that has been allocated to specific UE cannot ensure a QoS requirement of the UE, the DU may send a QoS modification message to a CU-CP through an F1 interface. The message may include information such as a PDU session ID. After receiving the message, the CU-CP may trigger a QoS management function of the first radio access controller, to be specific, may request, through the interface B, the first radio access controller to update a QoS parameter. For example, the CU-CP may send a QoS parameter update request to the first radio access controller, where the QoS parameter update request may include information such as an identifier of the UE, a QFI, and a currently used QoS profile, where the QoS profile may include the foregoing first QoS parameter. That is, the first QoS parameter is updated.

702: The first network element determines a third QoS parameter based on service requirement information of a user and the radio network resource of the second network element.

Alternatively, the first network element may determine a third QoS parameter based on service requirement information of a user, attribute information of the user, and the radio network resource of the second network element.

For example, the first radio access controller may determine the new third QoS parameter or update the QoS profile by using an AI/ML method based on information such as a user priority, a SPID, high priority access, a media type, a bandwidth requirement, and data of the available radio network resource.

703: The first network element sends the third QoS parameter to the second network element.

The first radio access controller may return the third QoS parameter to the AN network element (the CU-CP), and may further return the information such as the identifier of the UE and the QFI to the AN network element.

704: Refer to steps 609 to 613.

A difference lies in that the first QoS parameter is updated to the third QoS parameter.

This step is similar to steps 609 to 613. The updated third QoS parameter also needs to be notified to the SMF, and the AN network element further needs to allocate a resource based on the third QoS parameter.

Therefore, when the AN network element initiates the QoS parameter update request, the AN network element does not need to interact with a core network, and the first radio access controller may adjust the QoS parameter in time based on the network status. In this way, a response to the change of the network status can be made in time, and signaling exchange between an AN side and the core network can be reduced.

Embodiment 4

Because a probability that service requirement information of a user changes is low, a QoS management functional component may obtain the service requirement information through only one procedure, and the service requirement information does not need to be transmitted in PDU session establishment procedures of all users using a same service, to avoid consumption of a large quantity of interface resources. Therefore, this application provides a solution. In this solution, after a QoS management policy is deployed and installed, the QoS management functional component may directly request required service requirement information from a core network through an AN network element. This step does not rely on a PDU session establishment procedure of specific UE.

Figure 8A:
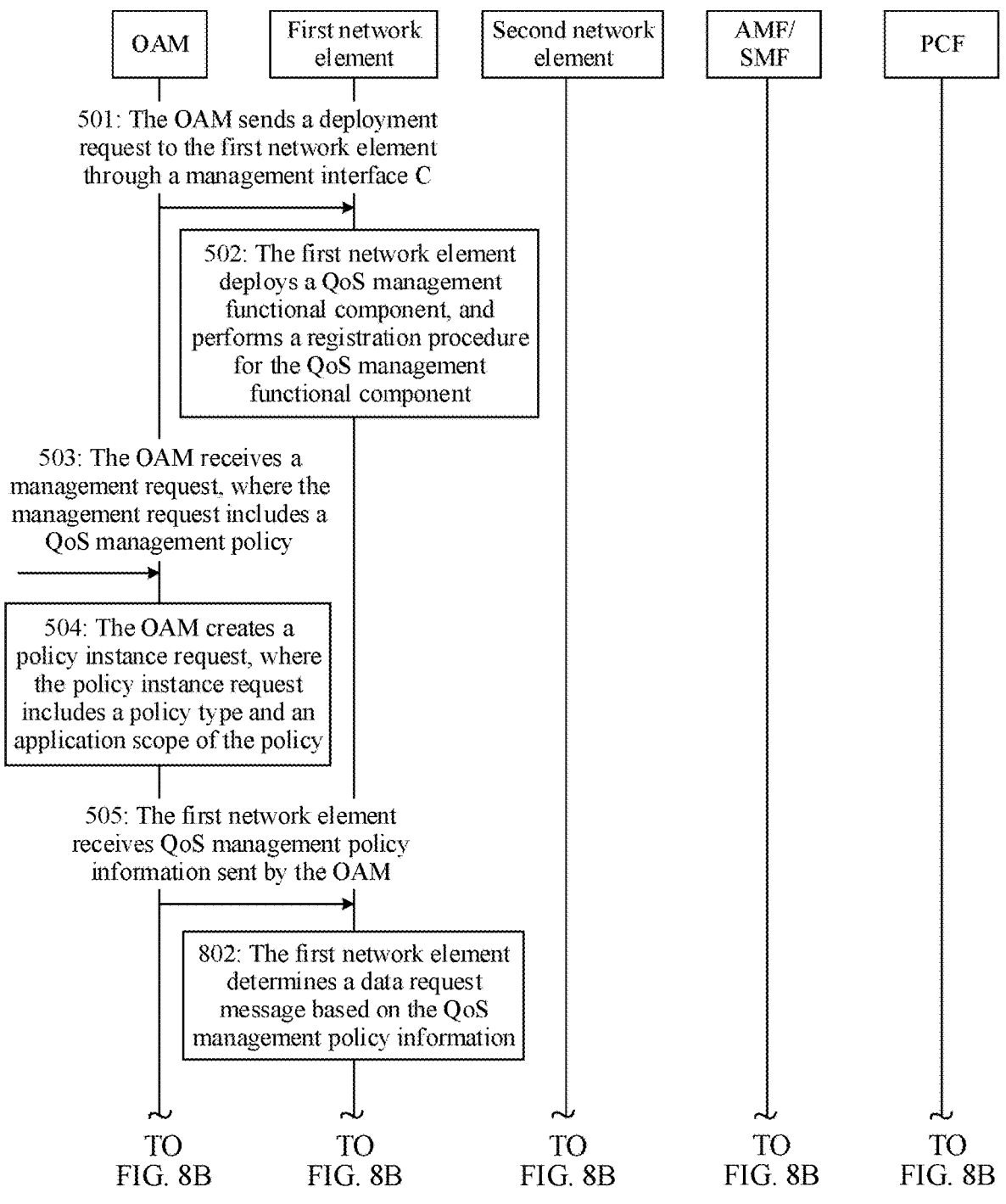

A difference between this solution and Embodiment 1 mainly lies in different data obtaining manners of the service requirement information. In addition, because the data obtaining manner varies, a PDU session establishment solution is slightly different from the solution in Embodiment 2. Refer to a schematic flowchart of FIG. 8A and FIG. 8B.

801: Refer to steps 501 to 505 in Embodiment 1.

802: The first network element determines a data request message based on the QoS management policy information, where the data request message includes a requested data type and a data reporting method, the data type includes a radio network resource, and the data request message further includes an identifier of a service.

Different from the data request message in step 506, the data request message in step 802 further includes the identifier of the service, namely, a scope of the service, and a value of the identifier may be 5QI. For the data type and the data reporting method, refer to the descriptions in step 506.

There may be the following two solutions in which the first network element requests service requirement information from a core network element:

Solution 1: When the radio access controller platform function indirectly requests, through an AN network element (a CU-CP), the service requirement information from an SMF (or an AMF), after step 802, the method may further include the following step:

803a: The first network element sends the data request message to the second network element.

The AN network element may collect status information of the radio network resource based on the data type and the data reporting method in the data request message. However, the AN network element needs to request the service requirement information from the core network element. Therefore, the method further includes the following steps.

804a: The second network element sends, to the AMF/SMF, a data request message for requesting the service requirement information.

The data request message herein includes the identifier of the service, to obtain the service requirement information corresponding to the identifier of the service.

805a: The AMF/SMF sends, to a PCF, a data request message for requesting the service requirement information.

806a: The PCF sends, to the AMF/SMF, a data request response message in response to requesting the service requirement information.

The data request response message includes the requested service requirement information.

807a: The AMF/SMF sends the service requirement information to the second network element.

The SMF may send the service requirement information to the CU-CP.

808a: The second network element sends the service requirement information to the first network element.

809a: Refer to step 507.

Solution 2: If there is an interface connection between the radio access controller platform function and a core network element AMF, the radio access controller platform function may directly request the service requirement information from a core network element AMF/SMF. In this case, after step 802, the method may further include the following steps.

803b: The first network element sends the data request message to the SMF through an interface between the first network element and the AMF/SMF.

The data request message is for requesting the service requirement information and status information of the radio network resource of the AN network element.

804b: The SMF/AMF requests, from a PCF, the service requirement information requested in the data request message.

805b: The PCF sends a data request response message to the SMF/AMF, where the data request response message includes the service requirement information.

806b: The SMF/AMF sends the service requirement information to the first network element.

The SMF/AMF may report the service requirement information to the radio access controller platform function through an interface between the SMF/AMF and the AMF.

807b: Refer to step 507.

In this way, the first radio access controller can collect not only the status information of the radio network resource of the AN network element but also the service requirement information. This does not rely on a PDU session establishment procedure of the UE, and reduces consumption of interface resources.

Figure 9A:
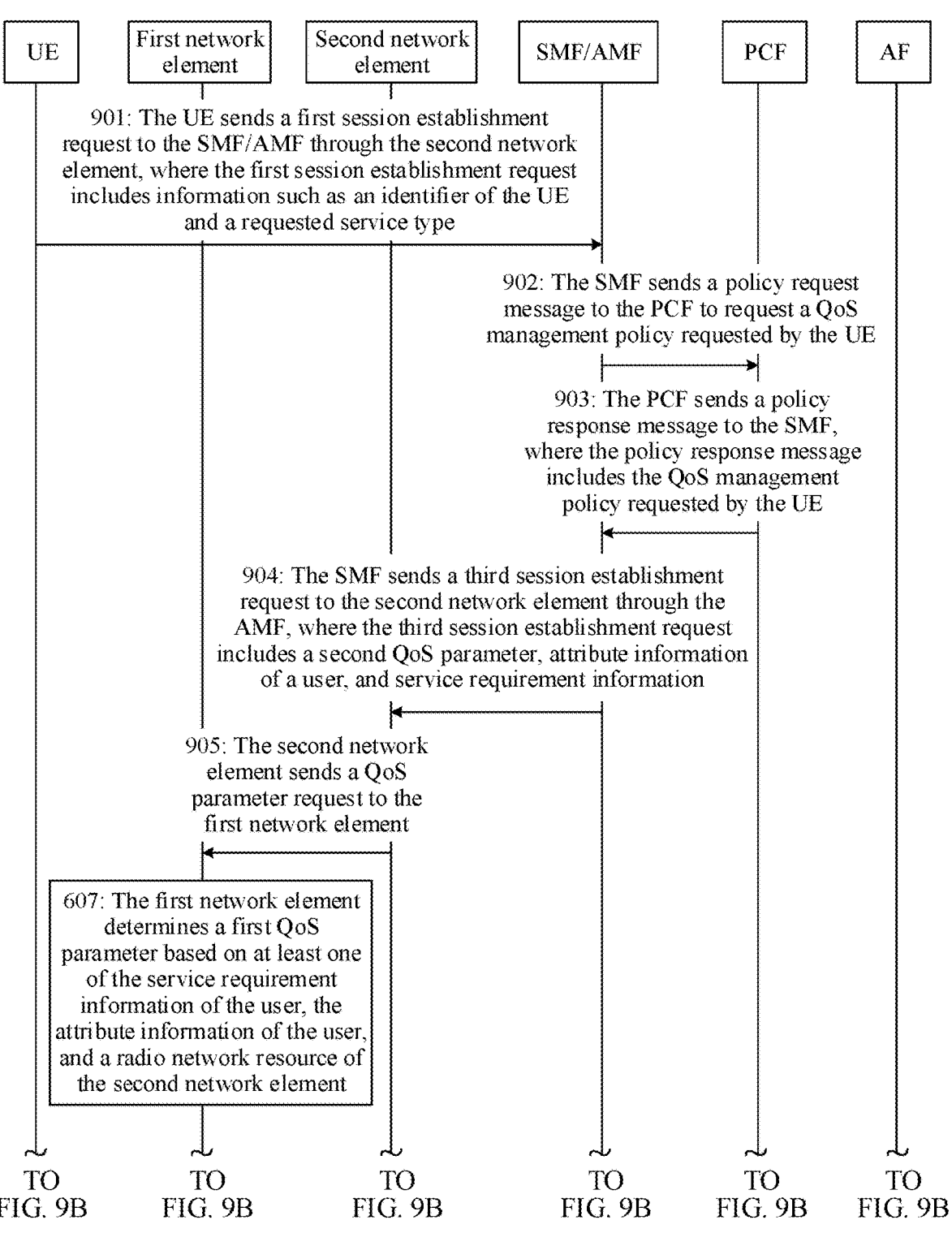
FIG. 9A and FIG. 9B are a diagram of signaling exchange in a QoS management method according to an embodiment of this application.
Figure 9B:
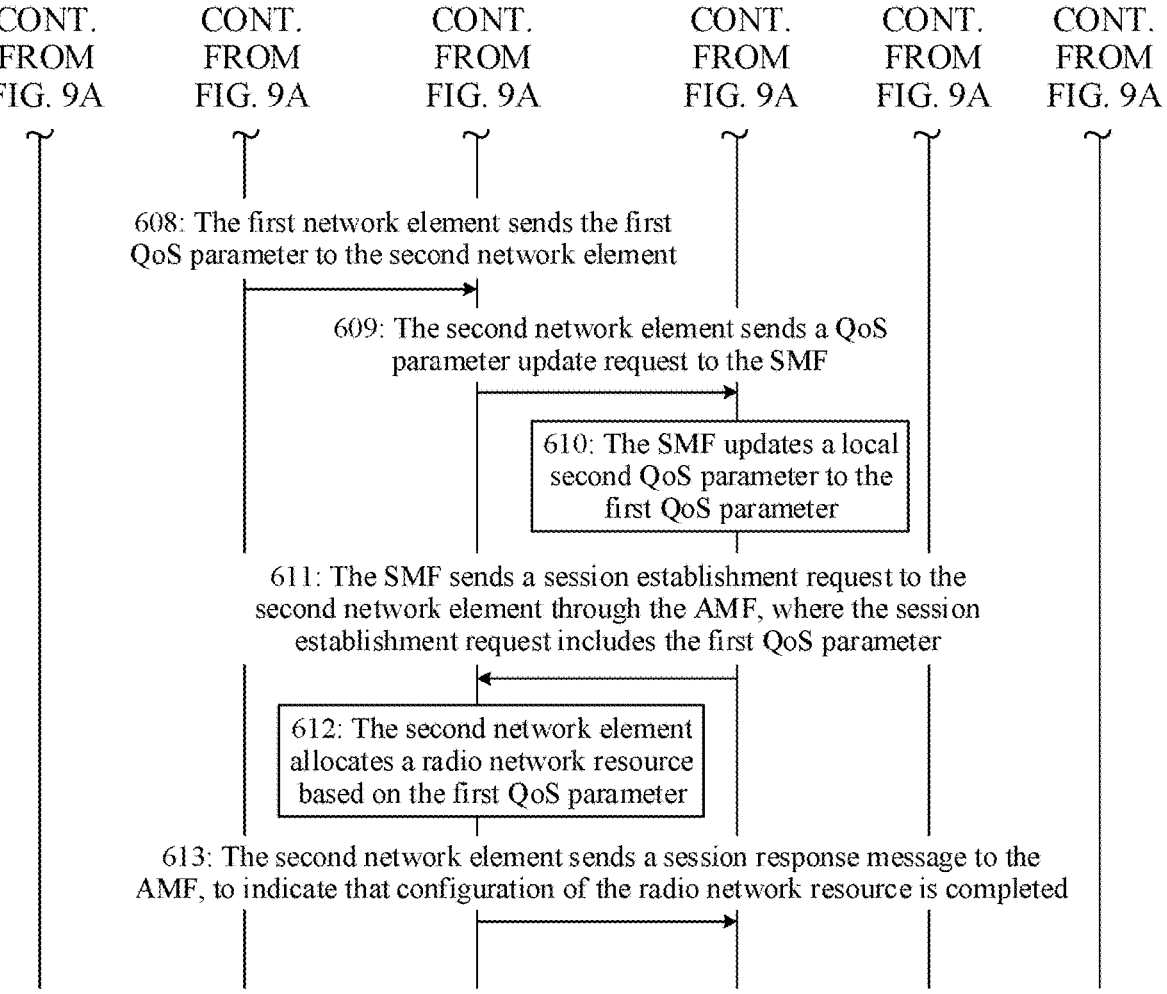

Because a data request manner changes, the PDU session establishment solution is slightly different from the solution in Embodiment 2. The difference mainly lies in: The AN network element does not need to request corresponding service data when forwarding a PDU session establishment NAS request of the UE, and service data information does not need to be transmitted through an interface between the AN network element and the core network element AMF/SMF. For an implementation thereof, refer to descriptions of a procedure shown in FIG. 9A and FIG. 9B. The procedure may include the following steps.

901: The UE sends a first session establishment request to the SMF/AMF through the second network element, where the first session establishment request includes information such as an identifier of the UE and a requested service type.

The first session establishment request may be the PDU session establishment NAS request.

902: The SMF sends a policy request message to the PCF to request a QoS management policy requested by the UE.

903: The PCF sends a policy response message to the SMF, where the policy response message includes the QoS management policy requested by the UE.

904: The SMF sends a third session establishment request to the second network element through the AMF, where the third session establishment request includes a second QoS parameter, attribute information of the user, and the service requirement information.

The third session establishment request may be an N2 PDU session request message, and the N2 PDU session request message includes the second QoS parameter, the attribute information of the user, and the like that are sent by the SMF to the AN network element. To be specific, a difference from step 605 is that the N2 PDU session request message herein does not carry the service requirement information, and steps 602 to 604 are omitted.

905: The second network element sends a QoS parameter request to the first network element, where the QoS parameter request is for requesting a QoS parameter.

A difference from step 606 is that the QoS parameter request does not include the service requirement information.

906: Refer to steps 607 to 613.

In this way, according to Embodiment 4, the first radio access controller indirectly obtains the service requirement information from the core network through the AN network element and an N2 interface. This has slight impact on a current PDU session establishment solution in a 5G network.

Embodiment 5

Figure 10:
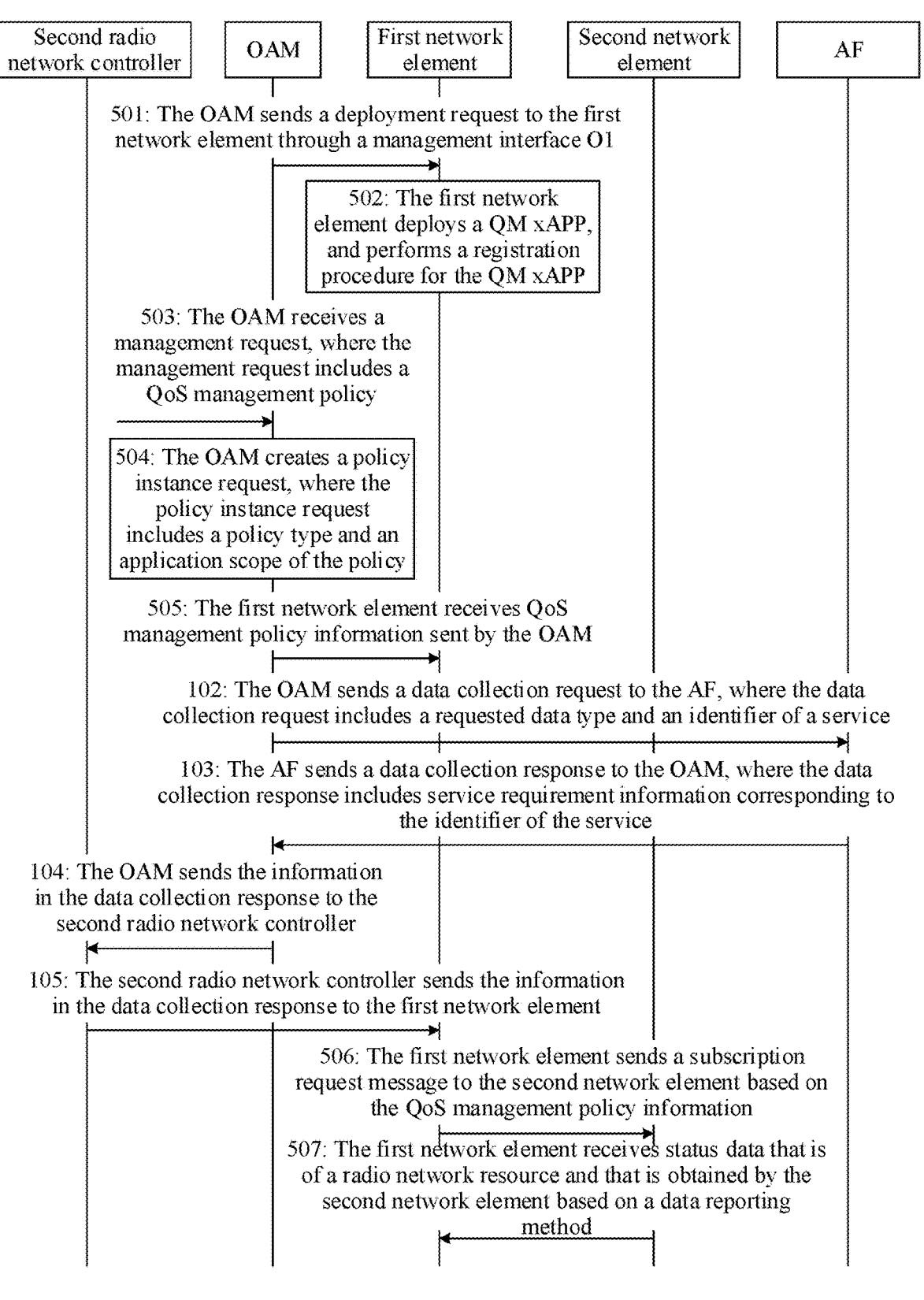
FIG. 10 is a schematic diagram of a QoS policy configuration and data request procedure according to an embodiment of this application.

A solution described in Embodiment 5 is also a QoS policy configuration and data request procedure. In this embodiment, a request for service requirement information may be obtained at a time through a management plane, to be specific, after receiving a policy deployment request, an OAM may initiate, through a management interface, a request for obtaining the service requirement information from an AF. When receiving data returned by the AF, the OAM may send the returned data to a second radio access controller, and then the second radio access controller sends the data to a first radio access controller through an interface A. In this way, control-plane signaling exchange can be reduced, and network interface resources can be saved. FIG. 10 is a schematic diagram of the QoS policy configuration and data request procedure. The procedure includes the following steps.

101: Refer to steps 501 to 505.

102: The OAM sends a data collection request to the AF, where the data collection request includes a requested data type and an identifier of a service.

The data type herein indicates service requirement information corresponding to the identifier (a 5QI group) of the service.

103: The AF sends a data collection response to the OAM, where the data collection response includes the service requirement information corresponding to the identifier of the service.

To be specific, the data collection response may include information such as the 5QI group, a media type, and a bandwidth requirement.

104: The OAM sends the information in the data collection response to the second radio access controller.

105: The second radio access controller sends the information in the data collection response to a first network element.

The second radio access controller may send the information in the data collection response to the first radio access controller through the interface A, and then the first radio access controller sends the information in the data collection response to a QoS management functional component.

106: Refer to steps 506 and 507.

According to the solution in Embodiment 5, because a data obtaining manner varies, a PDU session establishment solution is slightly different from the solution in Embodiment 2. The solution to the PDU session establishment procedure described in Embodiment 5 is the same as the solution to the PDU session establishment procedure in Embodiment 4, and repeated descriptions are omitted in Embodiment 5. Refer to the descriptions of the related steps in Embodiment 4.

It should be noted that, if an OAM of an AN network and an OAM of a core network are independent of each other in a carrier network, in the solution of Embodiment 5, if the OAM cannot directly interact with the AF of the core network, the OAM (the OAM of the AN) may first request data from the OAM corresponding to the core network (the OAM of the core network). The OAM of the core network then requests corresponding data from the AF. Finally, service information is indirectly returned to the OAM of the AN through the OAM of the core network.

Therefore, in Embodiment 5, the service requirement information is mainly obtained by the OAM from the AF through the management interface, so that control-plane signaling exchange can be reduced, and network interface resources can be saved.

Figure 11:
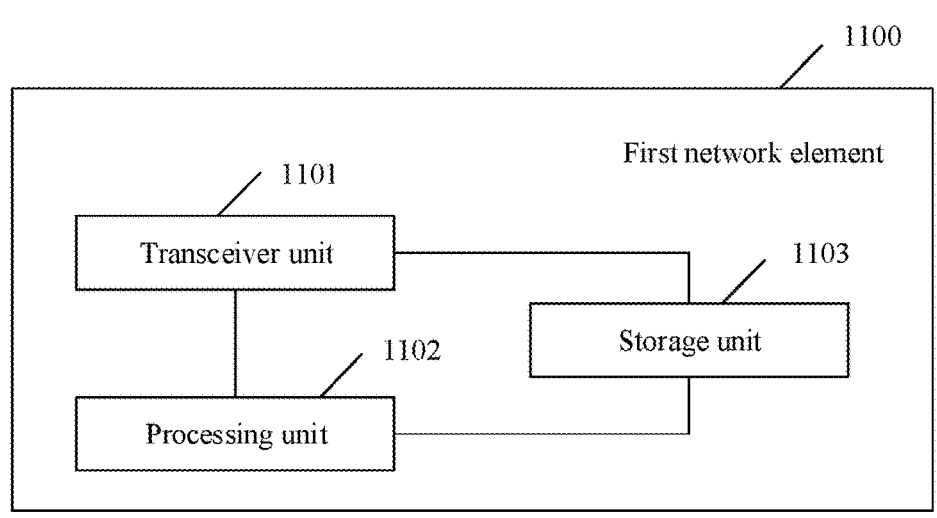
FIG. 11 is a schematic diagram of a structure of a first network element according to an embodiment of this application.
Figure 12:
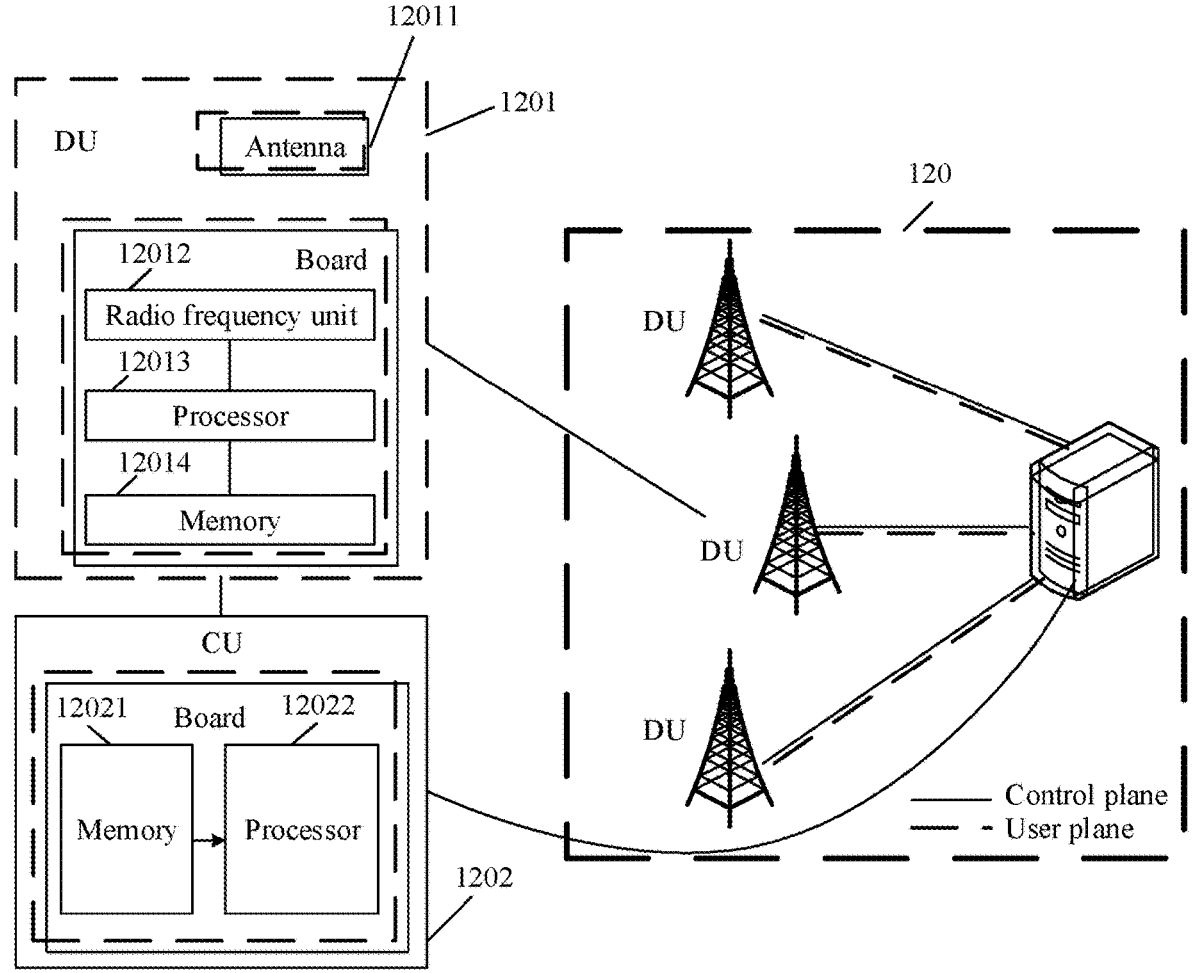
FIG. 12 is a schematic diagram of a structure of a base station according to an embodiment of this application.
Figure 13:
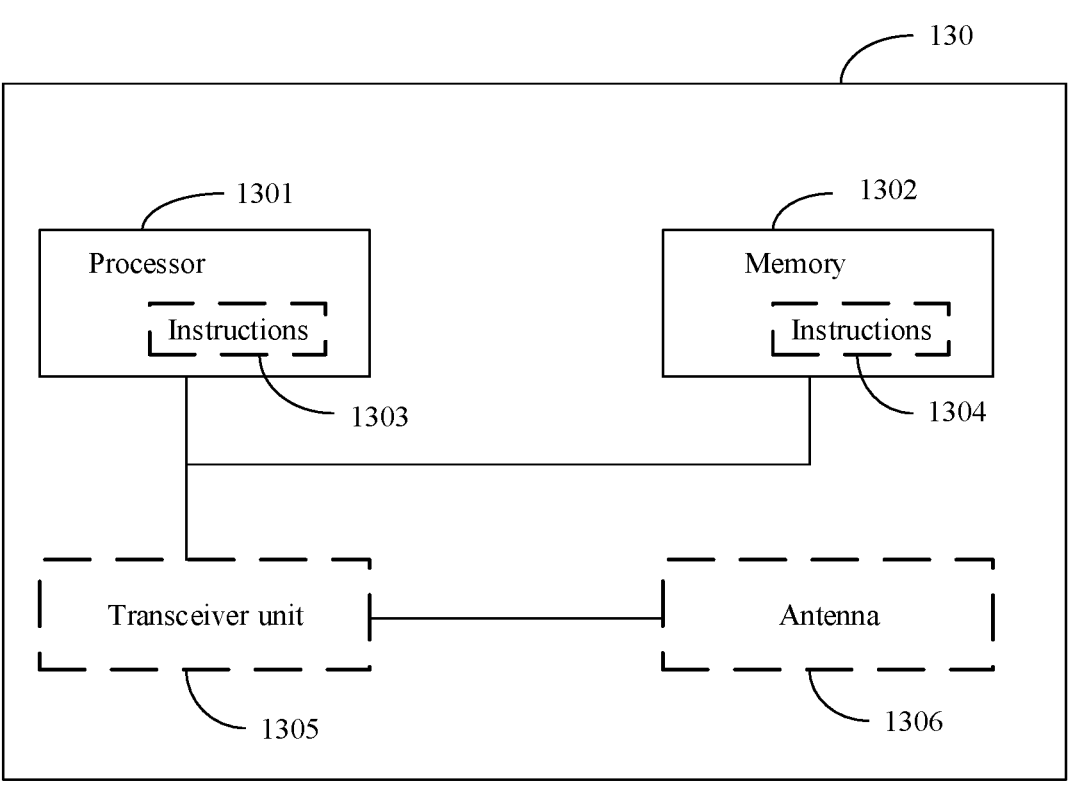
FIG. 13 is a schematic diagram of a structure of a communication apparatus according to an embodiment of this application.

With reference to FIG. 1 to FIG. 10, the foregoing describes the QoS management method in embodiments of this application in detail. With reference to FIG. 11 to FIG. 13, the following describes communication apparatuses in embodiments of this application in detail, for example, a first network element, namely, a first radio access controller, and a second network element, namely, an AN network element, or an apparatus (for example, a processor, a circuit, or a chip) used for the network element.

It may be understood that, to implement the foregoing functions, the network element includes corresponding hardware and/or a corresponding software module for performing each function. With reference to algorithm steps of each example described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the network element may be divided into functional modules based on the foregoing method examples. For example, each functional module may be obtained through division based on each function, or two or more functions may be integrated into one processing module. The integrated module may be implemented by hardware. It should be noted that, in embodiments, division into modules is an example and is merely logical function division. During actual implementation, there may be another division manner.

When each functional module is obtained through division based on a corresponding function, FIG. 11 is a possible schematic composition diagram of a first network element 1100 in the foregoing embodiments. The first network element 1100 may be a first radio access controller. As shown in FIG. 11, the first network element 1100 may include a transceiver unit 1101 and a processing unit 1102.

The transceiver unit 1101 may be configured to support the first network element 1100 in performing step 505, step 506, step 507, step 509, step 606, step 608, step 703, step 803*a*, step 803*b*, step 806*b*, and the like, and/or another process of the technology described in this specification.

The processing unit 1102 may be configured to support the first network element 1100 in performing step 502, step 607, step 702, step 802, and the like, and/or another process of the technology described in this specification.

The first network element 1100 may further include a storage unit 1103, configured to store corresponding code for performing the step in the method performed by the first network element 1100.

It should be noted that all related content of the steps in the foregoing method embodiments may be cited in function description of corresponding functional modules. Details are not described herein again.

The first network element 1100 provided in this embodiment is configured to perform a QoS management method, and therefore can achieve a same effect as the foregoing implementation method.

When an integrated unit is used, the first network element 1100 may include a processing module, a storage module, and a communication module. The processing module may be configured to control and manage actions of the first network element 1100, for example, may be configured to support the first network element 1100 in performing the step performed by the processing unit 1102. The storage module may be configured to support the first network element 1100 in storing program code, data, and the like. The communication module may be configured to support the first network element 1100 in communicating with another device, for example, communicating with a second network element AN.

The processing module may be a processor or a controller. The processing module may implement or execute various examples of logical blocks, modules, and circuits described with reference to content disclosed in this application. The processor may alternatively be a combination of processors implementing a computing function, for example, a combination of one or more microprocessors or a combination of a digital signal processor (DSP) and a microprocessor. The storage module may be a memory. The communication module may be specifically a device, for example, a radio frequency circuit, a Bluetooth chip, or a Wi-Fi chip, that interacts with another electronic device.

FIG. 12 is a schematic diagram of a structure of a network device according to an embodiment of this application, and for example, may be a schematic diagram of a structure of the foregoing second network element, namely, the foregoing AN network element. The AN network element may be a base station. As shown in FIG. 12, the base station may be used in the system shown in FIG. 3 or FIG. 4, to perform functions of the second network element in the foregoing method embodiments. The base station 120 may include one or more DUs 1201 and one or more CUs 1202. The CU 1202 may communicate with an NG core (NC). The DU 1201 may include at least one radio frequency unit 12012, at least one processor 12013, and at least one memory 12014. The DU 1201 may further include at least one antenna 12011. The DU 1201 is mainly configured to send and receive a radio frequency signal, perform conversion between the radio frequency signal and a baseband signal, and perform some baseband processing. The CU 1202 may include at least one processor 12022 and at least one memory 12021. The CU 1202 and the DU 1201 may communicate with each other through an interface. A control plane interface may be F1-C, and a user plane interface may be F1-U.

The CU 1202 is mainly configured to: perform baseband processing, control the base station, and so on. Physically, the DU 1201 and the CU 1202 may be disposed together, or may be disposed separately, that is, in a distributed base station. The CU 1202 is a control center of the base station, may also be referred to as a processing unit, and is mainly configured to implement a baseband processing function. For example, the CU 1202 may be configured to control the base station to perform an operation procedure related to the network device in the foregoing method embodiments.

Specifically, baseband processing on the CU and the DU may be divided based on protocol layers of a radio network. For example, functions of a packet data convergence protocol (PDCP) layer and a protocol layer above the PDCP layer are set in the CU. Functions of protocol layers below the PDCP layer, such as a radio link control (RLC) layer and a media access control (MAC) layer, are set in the DU. For another example, the CU implements functions of a radio resource control (RRC) layer and a packet data convergence protocol (PDCP) layer. The DU implements functions of a radio link control (RLC) layer, a media access control (MAC) layer, and a physical (PHY) layer.

In addition, optionally (not shown in the figure), the base station 120 may include one or more antennas, one or more radio frequency units, one or more DUs, and one or more CUs. The DU may include at least one processor and at least one memory, the at least one antenna and the at least one radio frequency unit may be integrated into one antenna apparatus, and the CU may include at least one processor and at least one memory.

In an example, the CU 1202 may include one or more boards. A plurality of boards may jointly support a radio access network (for example, a 5G network) of a single access standard, or may separately support radio access networks (such as an LTE network, a 5G network, or another network) of different access standards. The memory 12021 and the processor 12022 may serve the one or more boards. In other words, a memory and a processor may be configured on each board. Alternatively, a plurality of boards may share a same memory and a same processor. In addition, a necessary circuit may be further configured on each board. The DU 1201 may include one or more boards. A plurality of boards may jointly support a radio access network (for example, a 5G network) of a single access standard, or may separately support radio access networks (such as an LTE network, a 5G network, or another network) of different access standards. The memory 12014 and the processor 12013 may serve the one or more boards. In other words, a memory and a processor may be configured on each board. Alternatively, a plurality of boards may share a same memory and a same processor. In addition, a necessary circuit may be further configured on each board.

FIG. 13 is a schematic diagram of a structure of a communication apparatus 130. The communication apparatus 130 may be configured to implement the methods described in the foregoing method embodiments. Refer to the descriptions in the foregoing method embodiments. The communication apparatus 130 may be a chip, a network device (for example, a base station), or a first radio access controller.

The communication apparatus 130 includes one or more processors 1301. The processor 1301 may be a general-purpose processor, a special-purpose processor, or the like. For example, the processor 1301 may be a baseband processor or a central processing unit. The baseband processor may be configured to process a communication protocol and communication data. The central processing unit may be configured to: control the apparatus (for example, the base station or the chip), execute a software program, and process data of the software program. The apparatus may include a transceiver unit configured to input (receive) and output (send) a signal. For example, the apparatus may be a chip, and the transceiver unit may be an input circuit and/or an output circuit or a communication interface of the chip. The chip may be used in a network device (for example, a base station). For another example, the apparatus may be a network device (for example, a base station), and the transceiver unit may be a transceiver, a radio frequency chip, or the like.

The communication apparatus 130 includes one or more processors 1301, and the one or more processors 1301 may implement the method performed by the second network element or the first radio access controller in the embodiments shown in FIG. 5 to FIG. 10.

Optionally, in a design, the processor 1301 may further include instructions 1303, where the instructions may be run on the processor, to enable the communication apparatus 130 to perform the methods described in the foregoing method embodiments.

In another possible design, the communication apparatus 130 may further include a circuit. The circuit may implement functions of the network device or the first radio access controller in the foregoing method embodiments.

In still another possible design, the communication apparatus 130 may include one or more memories 1302, storing instructions 1304. The instructions may be run on the processor, to enable the communication apparatus 130 to perform the methods described in the foregoing method embodiments. Optionally, the memory may further store data. Optionally, the processor may further store instructions and/or data. For example, the one or more memories 1302 may store a mobile valid area described in the foregoing embodiments, or a related parameter, a table, or the like in the foregoing embodiments. The processor and the memory may be separately configured, or may be integrated together.

In still another possible design, the communication apparatus 130 may further include a transceiver unit 1305 and an antenna 1306, or include a communication interface. The transceiver unit 1305 may be referred to as a transceiver, a transceiver circuit, or the like, and is configured to implement a transceiver function of the apparatus through the antenna 1306. The communication interface (not shown in the figure) may be used for communication between a core network device and the network device or communication between network devices. Optionally, the communication interface may be a wired communication interface, for example, an optical fiber communication interface.

The processor 1301 may be referred to as a processing unit, and controls the apparatus (for example, the first radio access controller or the base station).

In addition, because sending or receiving performed by the transceiver unit 1305 described in this embodiment of this application is under control of the processing unit (the processor 1301), a sending or receiving action may also be described as being performed by the processing unit (the processor 1301) in this embodiment of this application. This does not affect understanding of the solution by a person skilled in the art.

The terminal device and the network device in the foregoing apparatus embodiments may exactly correspond to the terminal device or the network device in the method embodiments, and a corresponding module or unit performs a corresponding step. For example, when the apparatus is implemented in a form of a chip, the receiving unit may be an interface circuit that is of the chip and that is configured to receive a signal from another chip or apparatus. The foregoing unit used for sending is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

The foregoing descriptions about implementations allow a person skilled in the art to understand that, for the purpose of convenient and brief description, division into the foregoing functional modules is taken as an example for illustration. During actual application, the foregoing functions may be allocated based on a requirement to different functional modules for implementation, that is, an inner structure of the apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, to be specific, may be located in one place, or may be distributed to a plurality of different places. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A quality of service QoS management method, comprising:

receiving, by a first network element, a QoS parameter request sent by a second network element, wherein the QoS parameter request comprises service requirement information of the user, a radio network resource of the second network element, and attribute information of the user including at least one of a user priority, a subscriber profile identifier SPID, or an indication indicating that a terminal device of the user has a high access priority;

determining, by the first network element, a first QoS parameter based on the service requirement information of the user, the attribute information of the user, and the radio network resource of the second network element; and sending, by the first network element, the first QoS parameter to the second network element, to enable the second network element to allocate a radio network resource based on the first QoS parameter.

2. The method according to claim 1, wherein the service requirement information comprises at least one of a media type and a bandwidth requirement of a service.

3. The method according to claim 1, wherein before receiving, by the first network element, the QoS parameter request, the method further comprises:

receiving, by the first network element, the service requirement information sent by an operation, administration, and maintenance OAM network element, wherein the service requirement information is requested by the OAM network element from an application function AF network element.

4. The method according to claim 1, wherein the QoS parameter request further comprises a second QoS parameter configured by a core network based on a service type requested by the user; and before determining, by the first network element, the first QoS parameter the method further comprises:

determining, by the first network element, that the second QoS parameter does not match the radio network resource of the second network element.

5. The method according to claim 1, wherein before receiving, by the first network element, the QoS parameter request, the method further comprises:

receiving, by the first network element, QoS management policy information sent by an operation, administration, and maintenance OAM network element, wherein the QoS management policy information comprises a policy type and an application scope of a policy, the policy type comprises a correspondence between a radio network resource and a QoS parameter, and the application scope of the policy comprises a service type to which the QoS management policy information is applied;

determining, by the first network element, a to-be-requested data type and a data reporting method based on the QoS management policy information, and sending a data request message to the second network element, wherein the data request message comprises the to-be-requested data type and the data reporting method, and the data type comprises a radio network resource; and receiving, by the first network element, status data that is of the radio network resource and that is obtained by the second network element based on the data reporting method.

6. The method according to claim 1, wherein the first network element comprises a radio access controller.

7. The method according to claim 1, wherein the second network element comprises an access network.

8. A quality of service QoS management method, comprising:

sending, by a second network element, a QoS parameter request to a first network element, wherein the QoS parameter request comprises service requirement information of the user, a radio network resource of the second network element, a second QoS parameter configured by a core network, and attribute information of the user including at least one of a user priority, a subscriber profile identifier SPID, or an indication indicating that a terminal device of the user has a high access priority;

receiving, by the second network element, a first QoS parameter sent by the first network element, wherein the first QoS parameter is determined by the first network element based on the service requirement information of the user, the attribute information of the user, and the radio network resource of the second network element; and allocating, by the second network element, a radio network resource based on the first QoS parameter.

9. The method according to claim 8, wherein the service requirement information comprises at least one of a media type and a bandwidth requirement of a service.

10. The method according to claim 8, wherein before sending, by the second network element, the QoS parameter request, the method further comprises:

receiving, by the second network element, a first data request message sent by the first network element, wherein the first data request message comprises a requested data type and a data reporting method, and the data type comprises a radio network resource; and sending, by the second network element, status data of the radio network resource to the first network element based on the data reporting method.

11. The method according to claim 10, wherein the first data request message further comprises an identifier of a service; and before sending, by the second network element, the QoS parameter request, the method further comprises:

sending, by the second network element, a second data request message to a core network element, wherein the second data request message comprises the identifier of the service, and the second data request message is for requesting, from the core network element, the service requirement information corresponding to the identifier of the service; and receiving, by the second network element, the service requirement information sent by the core network element.

12. The method according to claim 1, wherein the first network element comprises at least one processor and a memory, wherein the memory stores program instructions, and the program instructions are executed by the at least one processor to implement the steps of receiving the QoS parameter request, determining the first QoS parameter, and sending the first QoS parameter.

13. The method according to claim 8, wherein the first network element comprises at least one processor and a memory, wherein the memory stores program instructions, and the program instructions are executed by the at least one processor to implement the steps of sending the QoS parameter request, receiving the first QoS parameter, and allocating the radio network resource.

14. The method according to claim 8, wherein the first network element comprises a radio access controller.

15. The method according to claim 8, wherein the second network element comprises an access network.

16. A quality of service QoS management method, comprising:

receiving, by a first network element, a QoS parameter request sent by a second network element, wherein the QoS parameter request comprises service requirement information of the user, a radio network resource of the second network element, and attribute information of the user including at least one of a user priority, a subscriber profile identifier SPID, or an indication indicating that a terminal device of the user has a high access priority;

determining, by the first network element, a first QoS parameter based on the service requirement information of the user, the attribute information of the user, and the radio network resource of the second network element;

receiving, by the second network element, the first QoS parameter from the first network element, wherein the first QoS parameter is determined by the first network element based on the service requirement information of the user, the attribute information of the user, and the radio network resource of the second network element; and allocating, by the second network element, a radio network resource based on the first QoS parameter.

17. The method according to claim 16, wherein the service requirement information comprises at least one of a media type and a bandwidth requirement of a service.

18. The method according to claim 16, wherein before receiving, by the first network element, the QoS parameter request, the method further comprises:

receiving, by the first network element, the service requirement information sent by an operation, administration, and maintenance OAM network element, wherein the service requirement information is requested by the OAM network element from an application function AF network element.

19. The method according to claim 16, wherein the first network element comprises at least one processor and a memory, wherein the memory stores program instructions, and the program instructions are executed by the at least one processor to implement the steps of receiving the QoS parameter request and determining the first QoS parameter.

* * * * *